US012086682B1

(12) United States Patent
Irwin, Jr. et al.

(10) Patent No.: US 12,086,682 B1
(45) Date of Patent: Sep. 10, 2024

(54) AUTOMATED FRAUDULENT ALTERING AND PHOTOCOPYING DETECTION UTILIZING STEGANOGRAPHIC PATTERN DETECTION

(71) Applicant: IGT Global Solutions Corporation, Providence, RI (US)

(72) Inventors: Kenneth E. Irwin, Jr., Dawsonville, GA (US); Joseph Brandimore, Lakeland, FL (US); Brian Ingram, Murphy, NC (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

(21) Appl. No.: 18/435,331

(22) Filed: Feb. 7, 2024

Related U.S. Application Data

(60) Provisional application No. 63/504,528, filed on May 26, 2023.

(51) Int. Cl.
*G06K 7/14* (2006.01)
*G06T 5/20* (2006.01)
*G06T 7/13* (2017.01)
*G06T 11/60* (2006.01)
*G06V 10/24* (2022.01)
*G06V 30/10* (2022.01)

(52) U.S. Cl.
CPC ............. *G06K 7/1452* (2013.01); *G06T 5/20* (2013.01); *G06T 7/13* (2017.01); *G06T 11/60* (2013.01); *G06V 10/245* (2022.01); *G06V 30/10* (2022.01)

(58) Field of Classification Search
CPC .......... G06K 7/1452; G06T 5/20; G06T 7/13; G06T 11/60; G06V 10/245; G06V 30/10
See application file for complete search history.

(56) References Cited

U.S. PATENT DOCUMENTS

| 4,540,628 | A | 9/1985 | Oberdeck et al. |
| 5,346,258 | A | 9/1994 | Behm et al. |
| 5,479,507 | A | 12/1995 | Anderson |
| 5,542,710 | A | 8/1996 | Silverschotz et al. |
| 5,667,250 | A | 9/1997 | Behm et al. |
| 5,704,647 | A | 1/1998 | Desbiens |
| 5,769,458 | A | 6/1998 | Carides et al. |
| 5,803,504 | A | 9/1998 | Desbiens et al. |
| 6,939,627 | B2 | 9/2005 | Morizumi et al. |
| 7,252,222 | B2 | 8/2007 | Irwin et al. |
| 7,665,732 | B2 | 2/2010 | Stephens |
| 7,720,421 | B2 | 5/2010 | Snyder |

(Continued)

FOREIGN PATENT DOCUMENTS

| CA | 2278895 A1 | 1/2000 |
| CA | 2666784 A1 | 12/2009 |

(Continued)

OTHER PUBLICATIONS

Simske, Steven J., et al., "Variable Data Void Pantographs", Hewlett-Packard Development Company, L.P., Oct. 6, 2011.

*Primary Examiner* — Jamara A Franklin
(74) *Attorney, Agent, or Firm* — Neal, Gerber & Eisenberg LLP

(57) ABSTRACT

The present disclosure relates to systems, methods, and devices for automatically verifying the authenticity and integrity of documents such as but not limited to instant lottery tickets.

**20 Claims, 16 Drawing Sheets
(13 of 16 Drawing Sheet(s) Filed in Color)**

(56) References Cited

U.S. PATENT DOCUMENTS

| | | |
|---|---|---|
| 8,074,570 B2 | 12/2011 | Grotkowski et al. |
| 8,342,576 B2 | 1/2013 | Eschbach et al. |
| 8,366,153 B2 | 2/2013 | Martineck |
| 8,883,390 B1 | 11/2014 | Tyagi et al. |
| 9,087,288 B2 | 7/2015 | Altfeder et al. |
| 10,183,213 B2 | 1/2019 | Irwin et al. |
| 10,232,247 B2 | 3/2019 | Finnerty et al. |
| 10,377,162 B2 | 8/2019 | Finnerty et al. |
| 10,543,712 B2 | 1/2020 | Behm et al. |
| 10,752,035 B2 | 8/2020 | Finnerty et al. |
| 11,351,445 B2 | 6/2022 | Tevis et al. |
| 11,383,154 B2 | 7/2022 | Irwin |
| 2013/0287265 A1* | 10/2013 | Nepomniachtchi .......... G06Q 20/3276 382/115 |
| 2016/0350592 A1* | 12/2016 | Ma ............... G06V 10/757 |
| 2018/0247439 A1* | 8/2018 | Knodt ............ G06V 30/224 |
| 2023/0110999 A1 | 4/2023 | Irwin et al. |

FOREIGN PATENT DOCUMENTS

| | | |
|---|---|---|
| CA | 2761324 A1 | 6/2012 |
| EP | 0707507 A1 | 4/1996 |
| JP | H08244389 A | 9/1996 |
| WO | 2011117687 A1 | 9/2011 |

\* cited by examiner

AUTOMATED FRAUDULENT ALTERING AND PHOTOCOPYING DETECTION UTILIZING STEGANOGRAPHIC PATTERN DETECTION

PRIORITY

This patent application claims priority to and the benefit of U.S. Provisional Patent Application No. 63/504,528, filed May 26, 2023, the entire contents of which are incorporated herein by reference.

BACKGROUND

The present disclosure relates to documents, such as but not limited to instant lottery tickets, having variable indicia under a Scratch-Off Coating ("SOC"), and systems, methods, and devices that detect document alteration attacks as well as photocopying of SOC protected documents.

Scratch-off or instant lottery games have become a time-honored method of raising revenue for state and federal governments worldwide. The concept of hiding variable indicia (e.g., game symbols) under a SOC has also been applied to numerous other products, such as commercial contests, telephone card account numbers, gift cards, etc. Literally, billions of scratch-off products are printed every year where the SOCs are used to ensure that the product has not been previously used, played, or modified. Scratch-off instant lottery tickets are used as the primary example of such products herein, but such examples are not meant to limit the present disclosure.

Various scratch-off lottery tickets include variable indicia printed using a specialized high-speed inkjet, providing a human-readable indication of the value of each scratch-off lottery ticket. In lottery jurisdictions where no central site validation system is available to verify that a given scratch-off lottery ticket is a winner at the time of redemption, the reliance on retailer sight validation of the scratch-off lottery ticket creates an opportunity for illicit consumer fraud using ticket alteration techniques to create apparent winning scratch-off lottery tickets. These types of ticket alteration attacks occur primarily as cut-and-paste alterations where the variable indicia are removed from losing scratch-off lottery tickets and pasted onto another losing scratch-off lottery ticket to create an apparent winning scratch-off lottery ticket.

One known countermeasure against such ticket alteration attacks employs a Benday pattern in the scratch-off area of the ticket in an attempt to make ticket alternations involving cut-and-paste methods more obvious to retail clerks. FIG. 1A illustrates examples of Benday patterns printed in the background of instant lottery tickets after the SOC has been substantially removed. FIG. 1A shows two example instant lottery tickets 100 and 101 with Benday patterns 103 and 106 respectively printed in the background portions of the scratch-off areas under the variable indicia 104 and 105. Lottery ticket 100 is illustrated with some of the SOC 102 remaining. The Benday patterns 103 and 106 in the backgrounds of these example lottery tickets 100 and 101 are low contrast relative to the indicia and the background substrates. This low-contrast background ensures sufficient contrast with the variable indicia, so the consumer can readily identify any winning variable indicia.

FIG. 1A demonstrates that a cut-and-paste attempt to mortise a winning pattern of variable indicia onto a single lottery ticket can cause a break in the Benday lines so long as the cut-and-paste donor lottery ticket(s) has/had different Benday patterns. However, since certain Benday patterns are not imaged but printed with fixed printing plates (e.g., Flexographic, Gravure, or offset) on a printing press, such Benday patterns repeat periodically throughout a pack of lottery tickets. Given that gaining access to losing lottery tickets is not difficult (since there is no perceived value in losing lottery tickets), it is relatively easy to amass a collection of donor losing lottery tickets with identical background Benday patterns distributed over a periodic basis. Once the collection of identical Benday patterns is acquired, it becomes possible to generate cut-and-paste forgery lottery tickets using only identical Benday patterns, thereby defeating the intended Benday countermeasure.

In addition to the visible instant lottery ticket Benday patterns of FIG. 1A that function as a countermeasure to cut and paste forgeries, normally invisible (i.e., under white light illumination) Benday patterns have also been printed on instant lottery tickets. These invisible Benday patterns become visible under Ultraviolet (UV) light illumination. For example, FIG. 1B illustrates a portion of an instant lottery ticket 107 with its SOC removed, showing variable indicia 108 that are visible under normal white light as well as a surreptitious Benday pattern 109 that is only visible with the addition of UV light illumination. Lotteries utilize this type of instant lottery ticket to enable such methods of verifying a ticket's authenticity and integrity, as well as to provide a countermeasure to cut-and-paste forgery attacks.

Another countermeasure used to protect against photocopies of various documents is a void pantograph that includes extra information on the document that is apparent when the document is copied or scanned but invisible or not apparent when viewed by the human eye. For example, FIG. 1C illustrates original and photocopied versions 110 and 111 of the same document. The background 112 of the original document 110 includes a concealed message 113 (i.e., "VOID") that is difficult to detect with the unaided human eye. If the original document 110 is scanned or photocopied, the concealed message becomes apparent 114 in the photocopied document 111. This void pantograph effect is made possible by printing a light-colored concealed message with halftone screening manipulated to produce a dot pattern that is not apparent to the human eye but that a wide range of scanners and copiers will detect.

BRIEF SUMMARY

Various embodiments of the present disclosure relate to a method for verifying the authenticity of an instant lottery ticket having a steganographic Benday pattern printed in the background area adjacent to variable indicia of the instant lottery ticket. This method includes using a digital camera focused on the instant lottery ticket to acquire a digital ticket image of the instant lottery ticket and aligning the digital ticket image to an x/y grid, which includes: finding edges of the instant lottery ticket in the digital ticket image, determining a pair of edges of the instant lottery ticket in the digital ticket image that are smooth, determining a pair of edges of the instant lottery ticket in the digital ticket image that are perforated, aligning the pair of perforated edges of the instant lottery ticket in the digital ticket image to an x-axis of the x/y grid, and generating a modified digital ticket image. The method further includes analyzing the modified digital ticket image for the absence of an apparent Benday pattern; post-processing the modified digital ticket image to produce a Benday Digital Image; analyzing the Benday Digital Image for apparent Benday patterns printed in the background area of the instant lottery ticket; and verifying that the modified ticket image did not include an apparent Benday pattern and that the Benday Digital Image did include an apparent Benday pattern to validate the instant lottery ticket.

Various other embodiments of the present disclosure relate to a method for verifying the authenticity of an instant lottery ticket having a steganographic Benday pattern printed in a background area adjacent to variable indicia of the instant lottery ticket. This method includes: using a digital camera to acquire a digital ticket image of the instant lottery ticket; generating a modified digital ticket image including an x/y grid; using the modified digital ticket image to verify that the Benday pattern is not readily apparent; digitally creating a digital photocopy of the digital ticket image and saving a resultant Benday Digital Image; and determining an appearance of a Benday pattern in the Benday Digital Image to verify the authenticity of the instant lottery ticket.

Various other embodiments of the present disclosure relate to a method for verifying the authenticity of an instant lottery ticket having a steganographic Benday pattern printed in a background area adjacent to variable indicia of the instant lottery ticket. This method includes using a digital camera to acquire a digital ticket image of the instant lottery ticket; using the digital ticket image to verify that the Benday pattern is not readily apparent; digitally creating a digital photocopy of the digital ticket image; and detecting if a Benday pattern is present in the digital photocopy using an Artificial Intelligence (AI) neural network to verify the authenticity of the instant lottery ticket.

Additional features are described herein and will be apparent from the following Detailed Description and the figures.

BRIEF DESCRIPTION OF THE SEVERAL VIEWS OF THE DRAWINGS

The patent or patent application file contains at least one drawing executed in color. Copies of this patent or patent application publication with color drawings will be provided by the Office upon request and payment of the necessary fee.

DETAILED DESCRIPTION

Figure 1A:
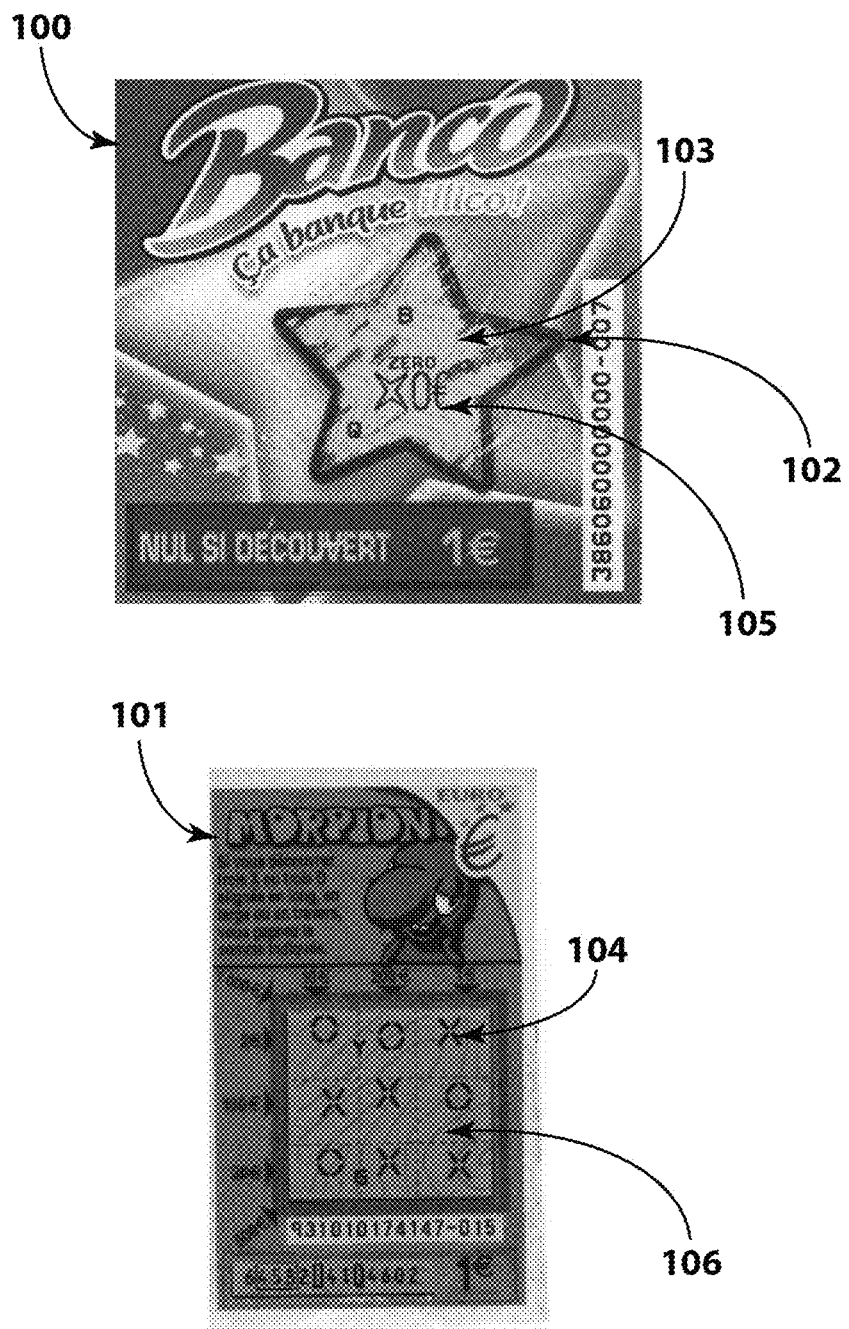
FIG. 1A is a front view of a representative example of known instant lottery tickets showing human-readable variable indicia and text as well as Benday patterns.
Figure 1B:
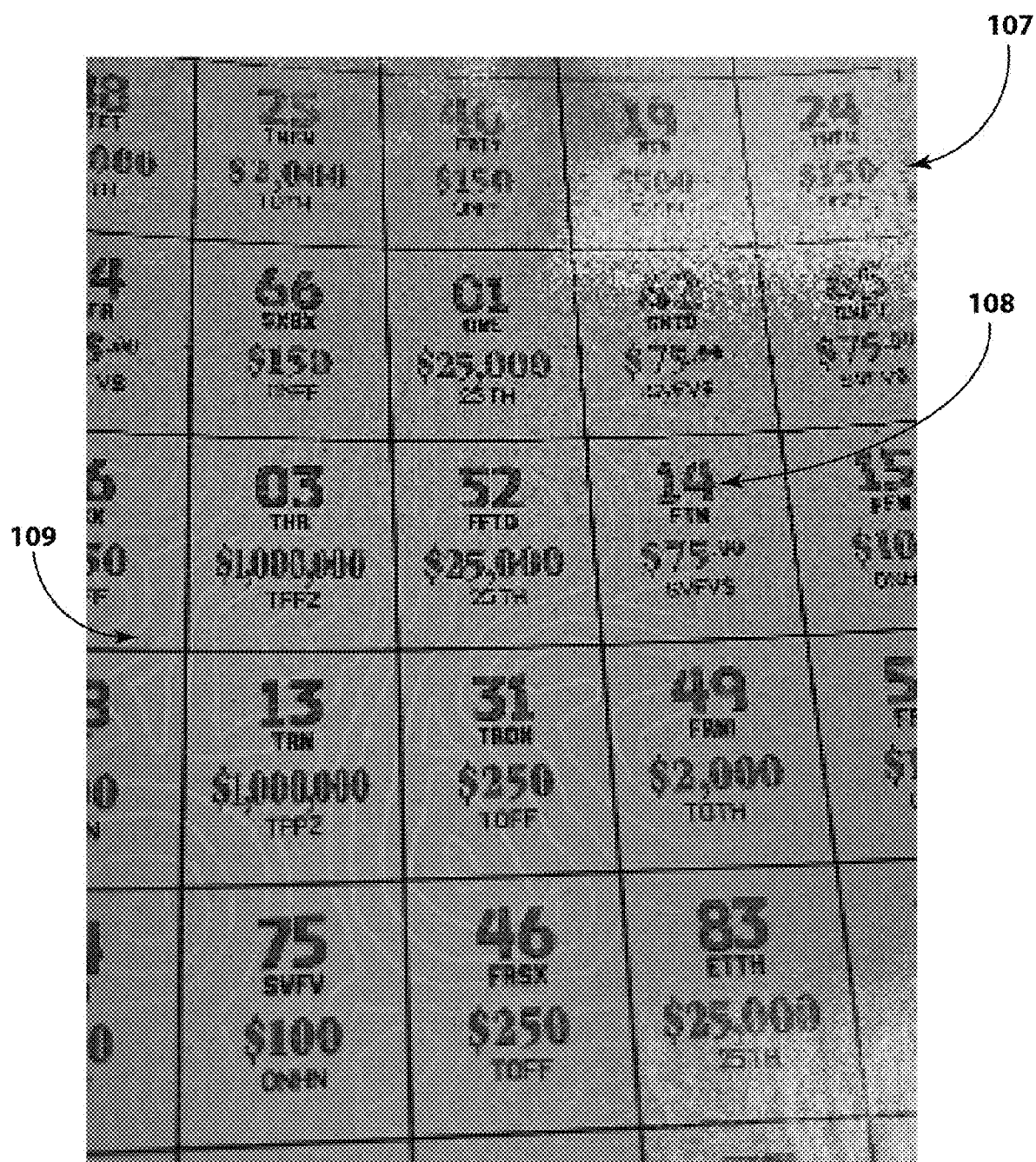
FIG. 1B is a front view of an example known instant lottery ticket with a Benday pattern readily apparent.
Figure 1C:
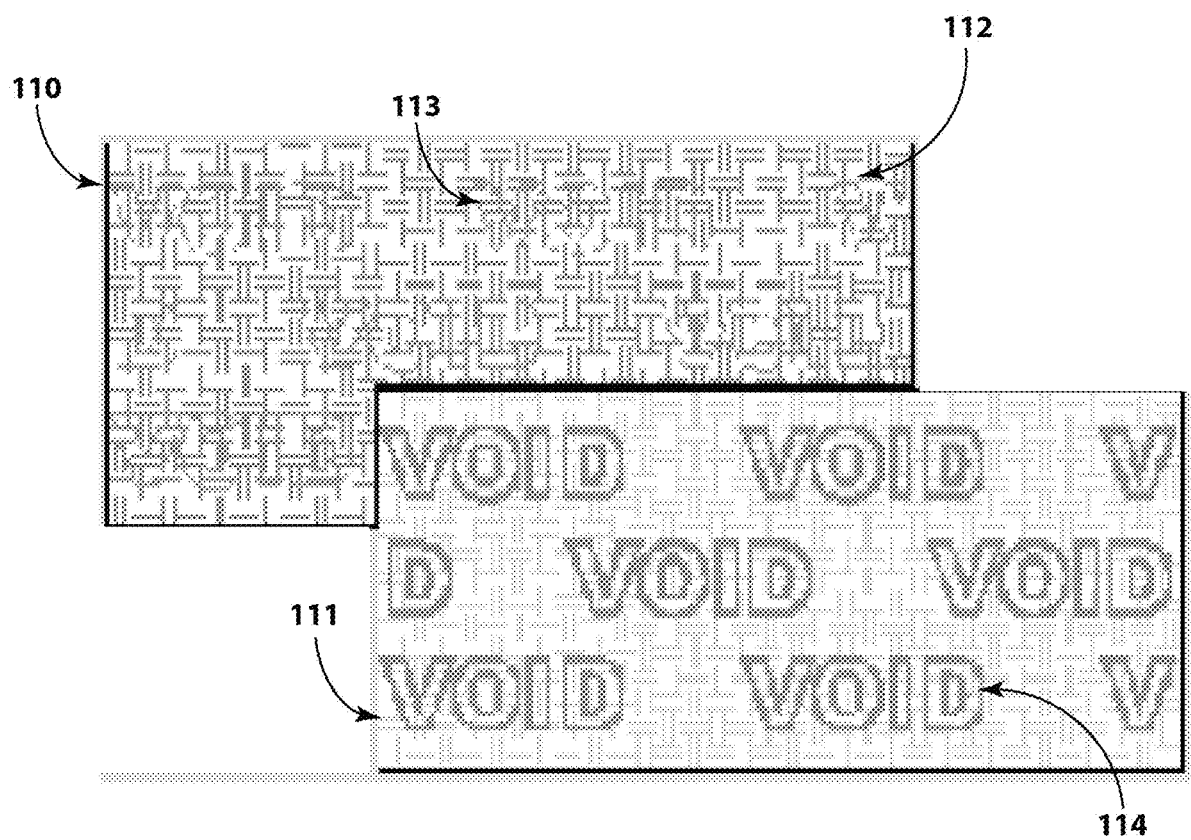
FIG. 1C is a front view of an example known void pantograph printed document showing both the original document and a photocopy of the original document.

Certain terminology is used herein for convenience only and is not to be taken as a limitation on the present disclosure.

The terms "scratch-off lottery ticket," "commercial contest scratch ticket," "telephone card account number card," "scratch-off gift cards," and "scratch-off card" are sometimes referred to as an "instant lottery ticket" or sometimes more simply a "ticket" or a "document" throughout the present disclosure.

The words "image" or "print' are used equivalently and refer to whatever indicium or indicia is or are created directly or indirectly on any substrate or surface may be done by any known or new imaging or printing method or equipment. Likewise, the words "imaging" or "printing" describing a method and "imaged" or "printed" describing the resulting indicium or indicia are used equivalently and correspondingly to "image" or "print."

The term "variable indicium" or "variable indicia" refers to imaged indicia that indicate information relating to a property, such as, without limitation, the value of the document such as for example, an instant lottery ticket, a coupon, a commercial game piece, or the like, where the variable indicium or indicia is or are hidden by a SOC or other obfuscation medium until the information or value is authorized to be seen, such as by a purchaser of the ticket who scratches off the SOC or other obfuscation medium, revealing the variable indicium or indicia. Examples of variable indicium or indicia as a printed embodiment include letters, numbers, icons, and figures.

The term "void pantograph" refers to a copy-evident and tamper-resistant pattern, such as in a background of a document. Normally void pantograph images are not apparent to the human eye but become apparent when the document is photocopied. In the present disclosure, the example steganographic void pantograph images embedded in ticket backgrounds embody Benday patterns.

The terms "moiré patterns," "line moiré," or "shape moiré" all refer to printed interference patterns that can be produced when a partially opaque ruled pattern with transparent gaps is digitally overlaid on a printed similar pattern. For the moiré interference pattern to appear, the two patterns must not be completely identical but rather displaced, rotated, or have a slightly different pitch. Like void pantograph images, in this disclosure, the example steganographic moiré patterns embedded in ticket backgrounds embody Benday patterns.

Reference will now be made in detail to examples of the present disclosure, one or more embodiments of which are illustrated in the figures. Each example is provided by way of explanation of the present disclosure, and not as a limitation of the present disclosure. For instance, features illustrated or described with respect to one embodiment can be used with another embodiment to yield a further embodiment. It is intended that the present disclosure encompasses these, and other modifications and variations as come within the scope and spirit of the present disclosure. As mentioned above, lottery tickets are used herein as an example of the documents of the present disclosure for brevity and are not meant to limit the present disclosure.

Various embodiments of the present disclosure can be implemented as methods, of which examples have been provided. The acts performed as part of the methods can be ordered in any suitable way. Accordingly, embodiments can be constructed in which acts are performed in an order different than illustrated, which can include performing some acts simultaneously, even though such acts are shown as being sequentially performed in illustrative embodiments.

In various embodiments, the present disclosure relates to documents such as but not limited to instant lottery tickets having variable indicia under a SOC, and systems, methods, and devices that detect ticket alteration attacks as well as photocopying of these SOC protected documents.

In various embodiments, the present disclosure relates to systems, methods, and devices for verifying the authenticity of SOC protected documents.

In various embodiments, the present disclosure relates to systems, methods, and devices for verifying the integrity of SOC protected documents.

In various embodiments, the present disclosure relates to systems, methods, and devices for validating SOC protected documents.

In various embodiments, the present disclosure relates to systems, methods, and devices for validating SOC protected documents submitted for redemption.

In various embodiments, the present disclosure relates to systems, methods, and devices for detecting Benday patterns in a portion of an instant lottery ticket that is adjacent to or that surrounds the variable indicia.

In various embodiments, the present disclosure relates to systems, methods, and devices for enabling the automated detection of illicit photocopies and alterations of instant lottery tickets and other SOC protected documents.

In various embodiments, the present disclosure relates to systems, methods, and devices that enable the detection of instant lottery ticket photocopies and alterations by scanning the secure area (such as the area under the scratch-off coating) of an instant lottery ticket for the absence and/or presence of steganographic Benday patterns when that instant lottery ticket is submitted for redemption.

In various embodiments, the authenticity of the instant lottery ticket is verified by an Electronic Validation Machine ("EVM") first confirming the absence of a steganographic Benday pattern in the secure area of the instant lottery ticket, wherein the detection of a Benday pattern in the secured area of the instant lottery ticket is an indication that the instant lottery ticket is fraudulent. These embodiments provide countermeasures to fraudulent photocopied tickets being presented as authentic instant lottery tickets.

In various embodiments, the authenticity of the instant lottery ticket is verified by an EVM first observing the absence of a steganographic Benday pattern in the secure area of the instant lottery ticket with an initial image and then post-processing the initial captured image where the EVM expects to detect a previously hidden Benday pattern, and wherein the failure to detect an apparent Benday pattern in the post-processed scan is an indication that the instant lottery ticket is fraudulent. These embodiments provide countermeasures to both illicit photocopying as well as instant lottery ticket alterations. In various embodiments, the detection of steganographic Benday patterns on an instant lottery ticket can be performed by an EVM in the form of a lottery terminal or in the form of a smartphone or tablet with an application running thereon.

In various embodiments, the present disclosure provides systems, methods, and devices for first detecting printed Benday patterns and, upon detection, verifying that the detected Benday pattern is a facsimile of the Benday pattern originally printed on any given instant lottery ticket. These embodiments can be applied both to steganographic and standard benday printed patterns.

In various embodiments, the present disclosure provides systems, methods, and devices with an Artificial Intelligence (AI) neural network configured to "learn" how to detect both steganographic and traditional Benday patterns on a variety of instant lottery tickets under varying environmental circumstances. These embodiments have the advantage of enhanced sensitivity to low contrast Benday patterns as well as dirt and partially removed SOC robustness.

Figure 2A:
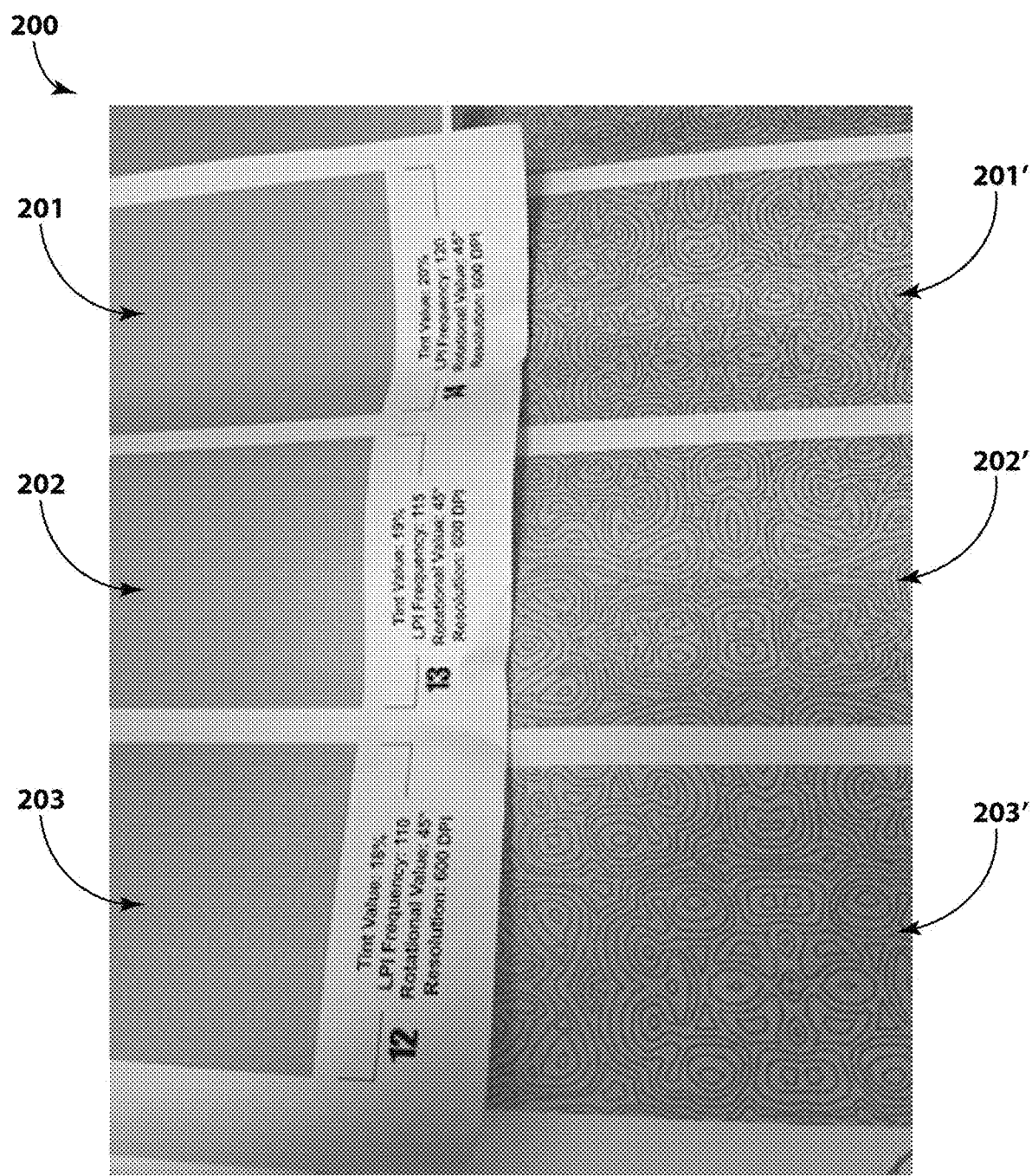
FIG. 2A is a front view of an example of original background patterns that can be printed in the secure area of an instant lottery ticket with embedded void pantograph Benday patterns not readily apparent on the originals, alongside photocopies of the same background patterns with the embedded void pantograph Benday patterns readily apparent in accordance with various embodiments of the present disclosure.

Turning now back to the drawings, the exemplary steganographic void pantograph documents 200 of FIG. 2A are divided into two different groups. Callouts 201, 202, and 203 show samples of original printed void pantograph background samples, and callouts 201', 202', and 203' show photocopies of the original printed void pantograph background samples 201, 220, and 203. The three printed void pantograph samples 201, 202, and 203 do not readily display the hidden steganographic Benday patterns to the human eye or to a camera. The three photocopies of these samples 201', 202', and 203' clearly reveal the previously hidden steganographic Benday patterns.

Figure 2B:
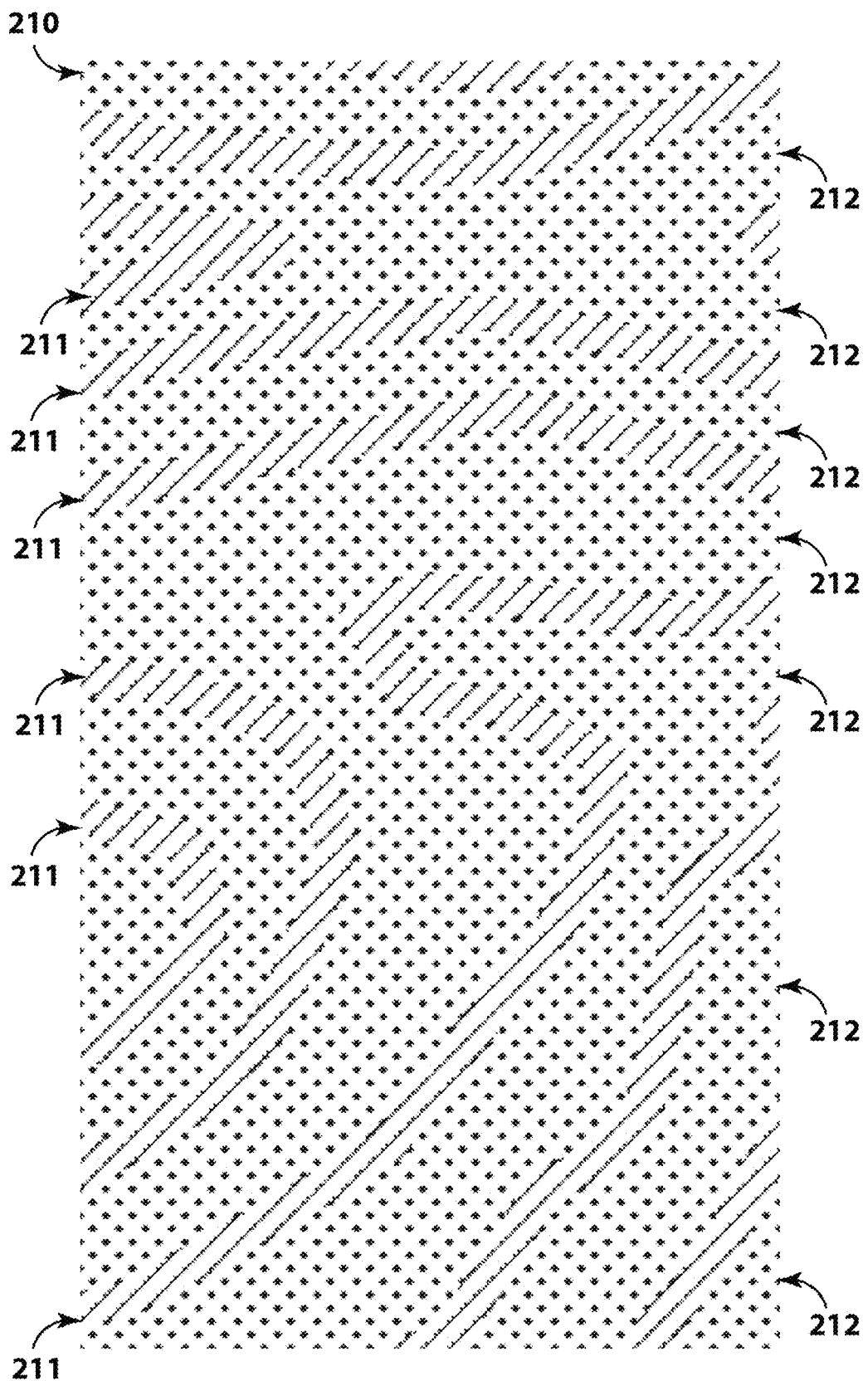
FIG. 2B is a magnified front view of a portion of an example background pattern of FIG. 2A highlighting the printing methodology to create the void pantograph Benday patterns in accordance with various embodiments of the present disclosure.

FIG. 2B illustrates a greatly magnified portion 210 of one of the exemplary void pantograph samples 202. As shown in this magnified portion 210, the homogeneous appearing gray background is formed from printed a series of dots 212 interspersed with multiple series of thin lines 211 that embody the steganographic Benday pattern. The printed raster of thin lines 211 in one direction on the background of dots 212 are affected differently during the photocopy scanning process creating aliasing distortions or artifacts that make the steganographic Benday pattern apparent in photocopies of the original documents. These same types of aliasing distortions or artifacts making the steganographic Benday patterns apparent can also be created in digital camera images by digitally simulating a scan bar in post-image processing. While FIG. 2B illustrates dots and lines, it should be appreciated that other patterns can be employed such as but not limited to differently sized dots spaced different distances apart, or circular dots interspersed with diamond or square dots.

The present disclosure contemplates that there are multiple different variations of void pantographs and moiré pattern printing (e.g., "big-dot-little-dot," a raster of lines in one direction on a background of lines in another direction) as well as fine line patterns that alias into visible Benday patterns that may be more desirable in certain embodiments. Regardless of the void pantograph or moiré pattern technique utilized, the present disclosure contemplates that these types of steganographic Benday patterns can be printed in the background of instant lottery tickets via either plate printing or digital imaging to produce previously hidden Benday patterns when copied or scanned.

The present disclosure contemplates that printed (void pantographs or moiré pattern) steganographic Benday images can be utilized to verify the authenticity and integrity of instant lottery tickets automatically. In various embodiments, by first using a digital color camera to capture a digital ticket image of an instant lottery ticket, then using that digital ticket image to verify that a Benday pattern is not readily apparent, then digitally simulating a photocopy scanning as a post process on the same captured digital ticket image, and then verifying the appearance of a Benday pattern on the same instant lottery ticket, a security countermeasure can be implemented to automatically ensure the authenticity and integrity of instant lottery tickets. It should be appreciated that in various other embodiments, a back and white digital camera can be employed in accordance with the present disclosure.

Figure 3A:
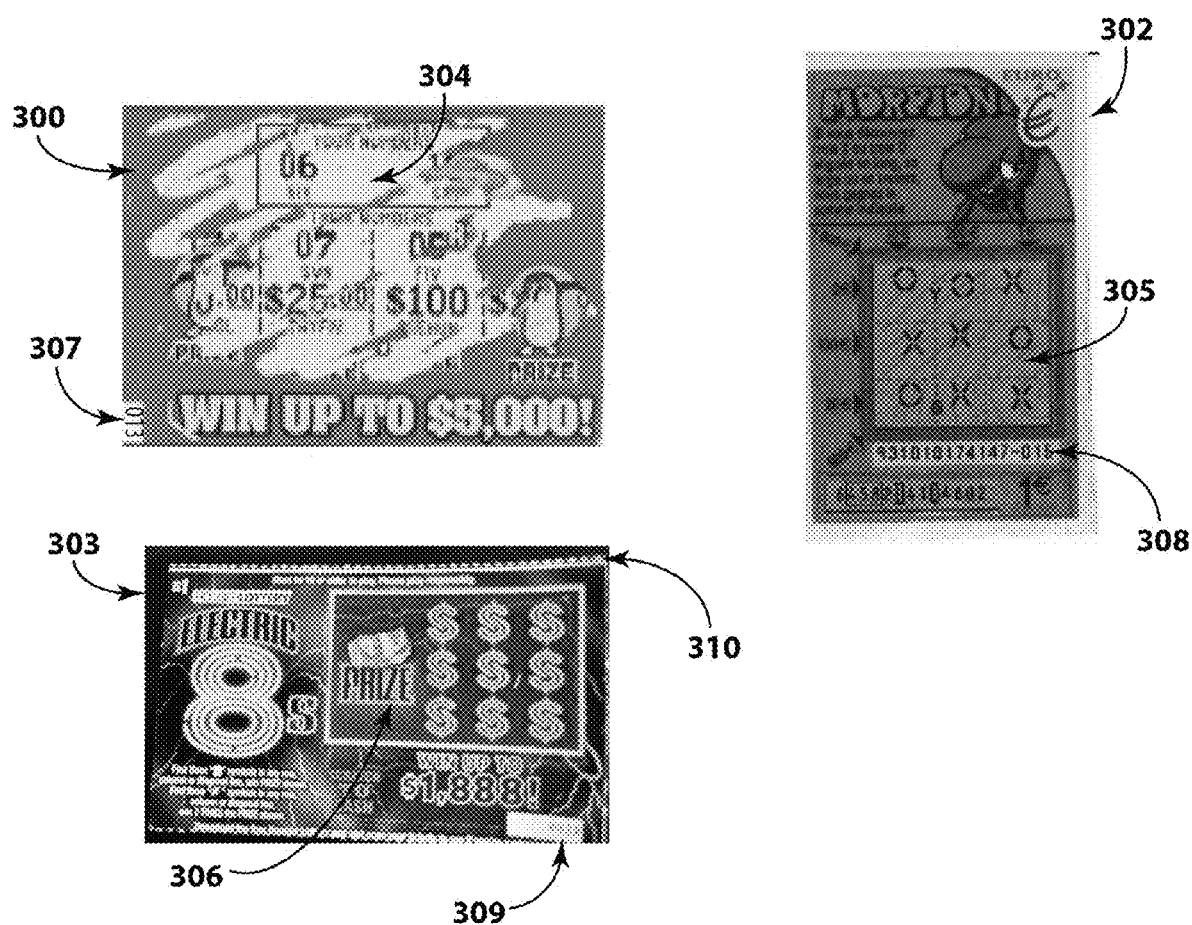
FIG. 3A is a front view of examples of known instant lottery tickets, where two of the example tickets are shown with their SOC removed, and one example ticket is shown with its SOC intact.

For example, FIG. 3A illustrates three exemplary instant lottery tickets 300, 302, and 303. Ticket 300 is shown with its SOC partially removed, revealing variable indicia printed over a solid-appearing background 304 that includes a steganographic void pantograph Benday pattern that is not apparent in FIG. 3A. Ticket 300 also illustrates an imaged ticket number 307 that will increment from ticket to ticket of a lottery game to ensure that the front and the back of the ticket are imaged in synchronization. Ticket 302 is illustrated with its SOC completely removed, showing a standard Benday pattern 305 (that is always visible) behind the printed variable indicia with its ticket number 308 printed below the play area of the ticket. Ticket 303 is illustrated with its SOC 306 intact and its ticket number ("VOID" in this image) in the lower right-hand corner of ticket 303. Ticket 303 also illustrates a tear-off perforation 310, which is present on two opposing edges of instant lottery tickets.

Figure 3B:
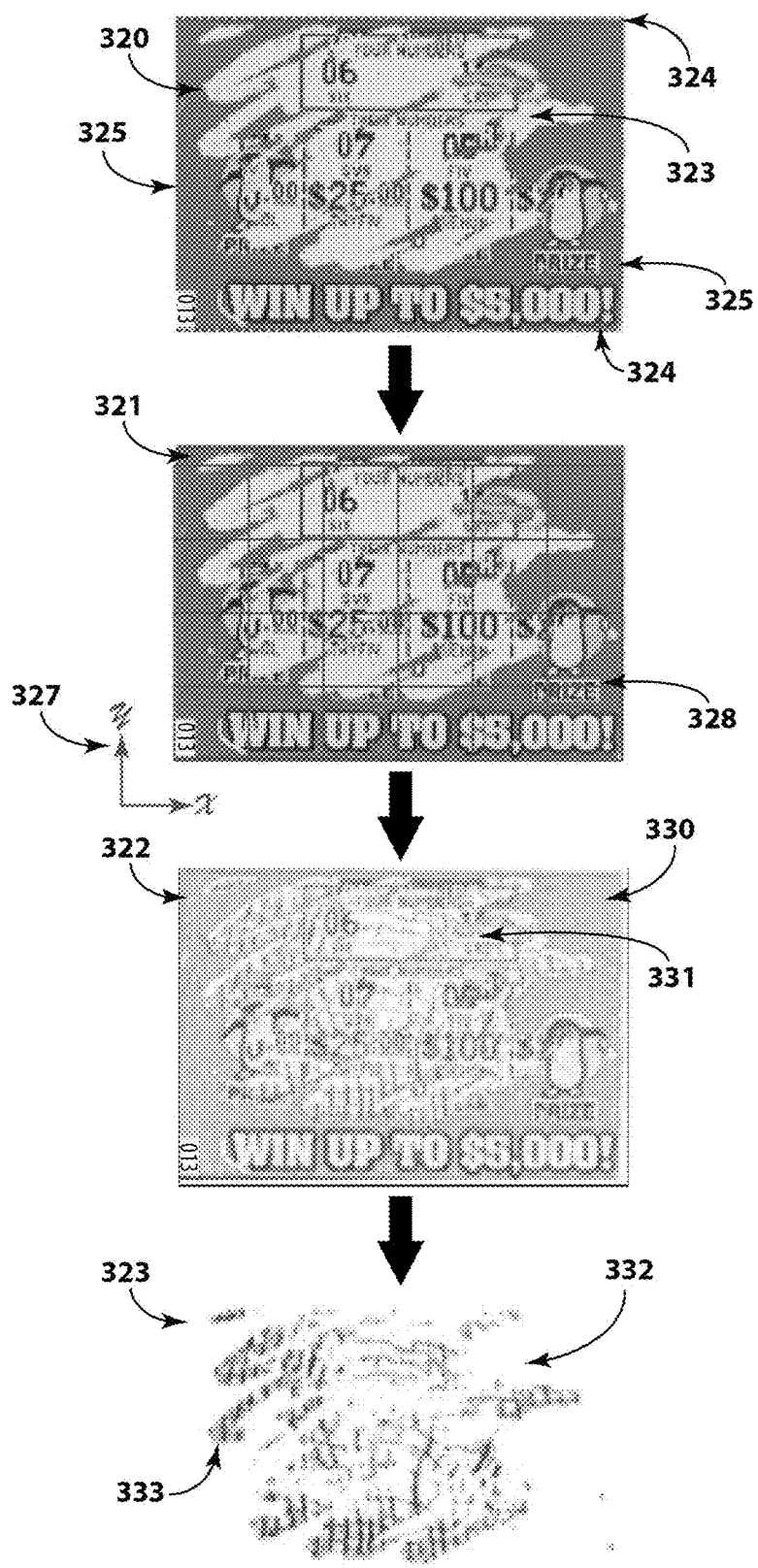
FIG. 3B is a series of front views of one of the example instant lottery tickets of FIG. 3A illustrating four conceptual stages of automatic steganographic Benday pattern detection in accordance with various embodiments of the present disclosure.

FIG. 3B illustrates a captured digital ticket image 320 of the exemplary ticket 300 of FIG. 3A with its SOC partially removed 323, revealing variable indicia with no apparent Benday patterns. This captured digital ticket image 320 also illustrates four edges of the ticket with the top and bottom edges 324 perforated and the side edges 325 smoothly cut. These ticket edge configurations (including the two edges 324 perforated across the top and bottom and two edges 325 smoothly cut across the sides) are present in most, if not all, instant lottery tickets.

After a digital ticket image of an instant lottery ticket is obtained by an EVM of the present disclosure, the EVM can digitally analyze the presented image to find the ticket's edges and determine which pair of edges are smooth 325 and which pair are perforated 324. Once the two pairs of ticket edges are found, the EVM can digitally overlay an x/y 327 grid 328 onto the digital ticket image 321 (taken by the EVM), thereby producing a modified digital ticket image with its perforated ticket edges parallel to the x-axis and smooth ticket edges parallel to the y-axis. Almost all instant lottery tickets are printed with their perforation 324 edges on the top and bottom edges of the ticket, thereby enabling rapid digital orientation of the modified digital ticket image by the EVM.

Figure 3C:
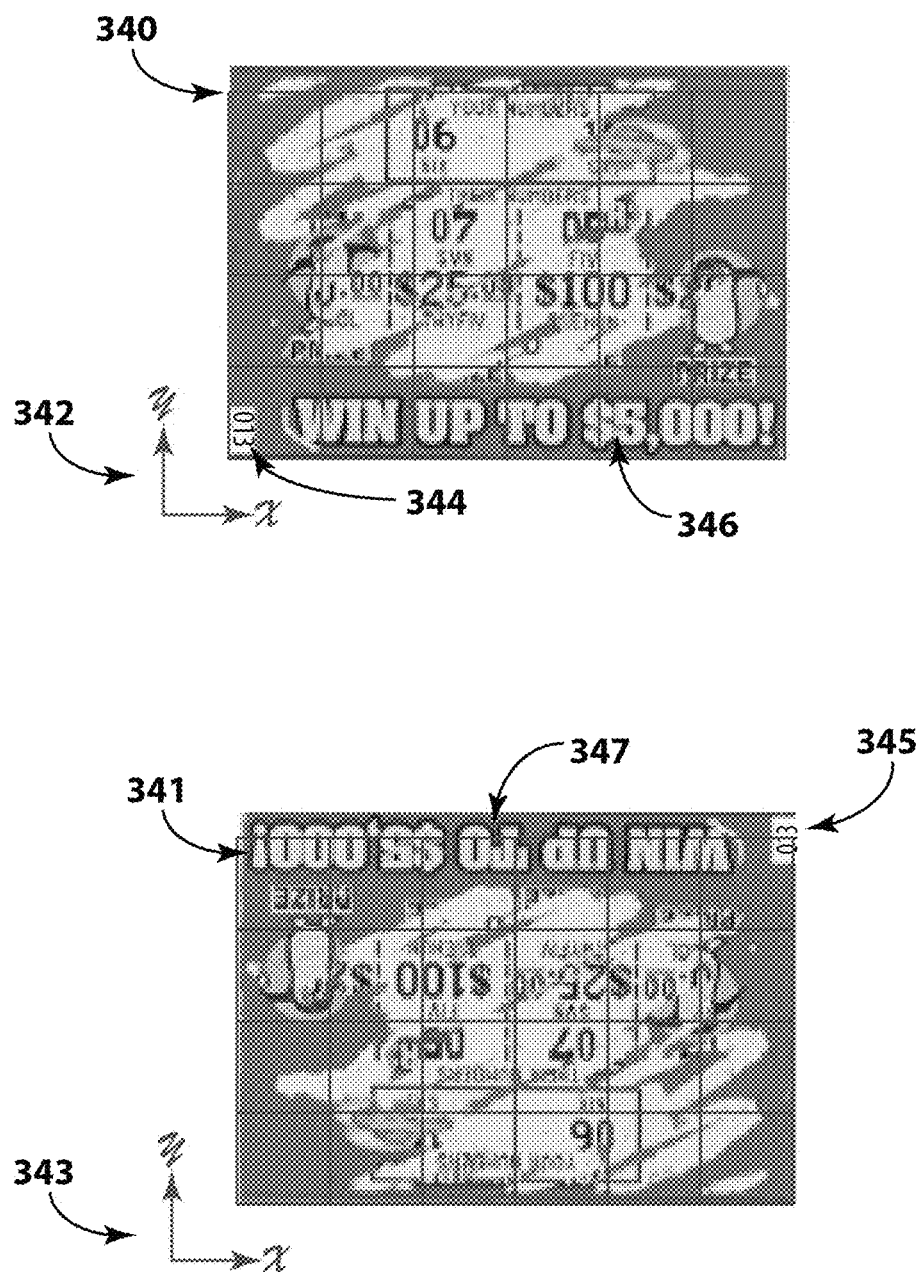
FIG. 3C is a pair of front views of one of the example instant lottery tickets of FIG. 3A illustrating two possible orientations in accordance with various embodiments of the present disclosure.

By only relying on the ticket's perforation 324 edges and smooth edges 325 for alignment, there are two possible ticket orientations that can emerge. The right-side-up orientation 340 as shown in FIG. 3C and an upside-down orientation 341 as also shown in FIG. 3C. Thus, the EVM can apply its digital grid to the modified digital ticket image in two possible places relative to the ticket's graphics (i.e., x/y axis 342 or x/y axis 343). The EVM can resolve this potential ambiguity such as via an Optical Character Recognition ("OCR") process that locates the ticket numbers 344 or 345 and/or other human-readable text 346 or 347 on the digital ticket image to determine the correct orientation of the digital ticket image. Alternatively, if a barcode is present on the front of the instant lottery ticket, the EVM can decode the barcode to determine the correct orientation of the digital ticket image from a stored file or a signature map.

Whichever methodology (if any) is employed to orient the modified digital ticket image of the instant lottery ticket, the EVM will subsequently align an x/y grid to the modified digital ticket image 321 as shown in FIG. 3B and then search for the absence of any apparent Benday pattern. Additionally, the EVM will initiate post-processing of the modified digital ticket image in an attempt to reveal any previously hidden steganographic Benday pattern. The exact nature of this post-processing reveal can vary depending on how the steganographic Benday pattern was embodied—such as a void pantograph or a moiré pattern.

After the steganographic Benday pattern reveal process is completed 323, the EVM can digitally enhance any revealed Benday pattern 331 by first bandpass filtering the Benday pattern's color, thereby eliminating all other colors in the modified digital ticket image as noise. Once the Benday pattern's color has been isolated, the EVM can further convert the modified digital ticket image to grayscale 330 such that the grayscale values only represent the color(s) of the Benday pattern. As shown in this example of FIG. 3B, the EVM can also apply to the modified digital ticket image a separate digital filter that eliminates all objects or artifacts wider than the Benday line, effectively eliminating the ticket's background 332, leaving mostly the Benday pattern 333 in the resultant modified digital ticket image.

The Benday pattern 333 illustrated in FIG. 3B appears as an irregular pattern because only a portion of the SOC was scratched off of the instant lottery ticket 320. This type of partial removal of the SOC is typical of instant lottery tickets redeemed in the field; and consequently, the present disclosure contemplates that the EVM can be configured to accommodate partially scratched instant lottery tickets.

Figure 4A:
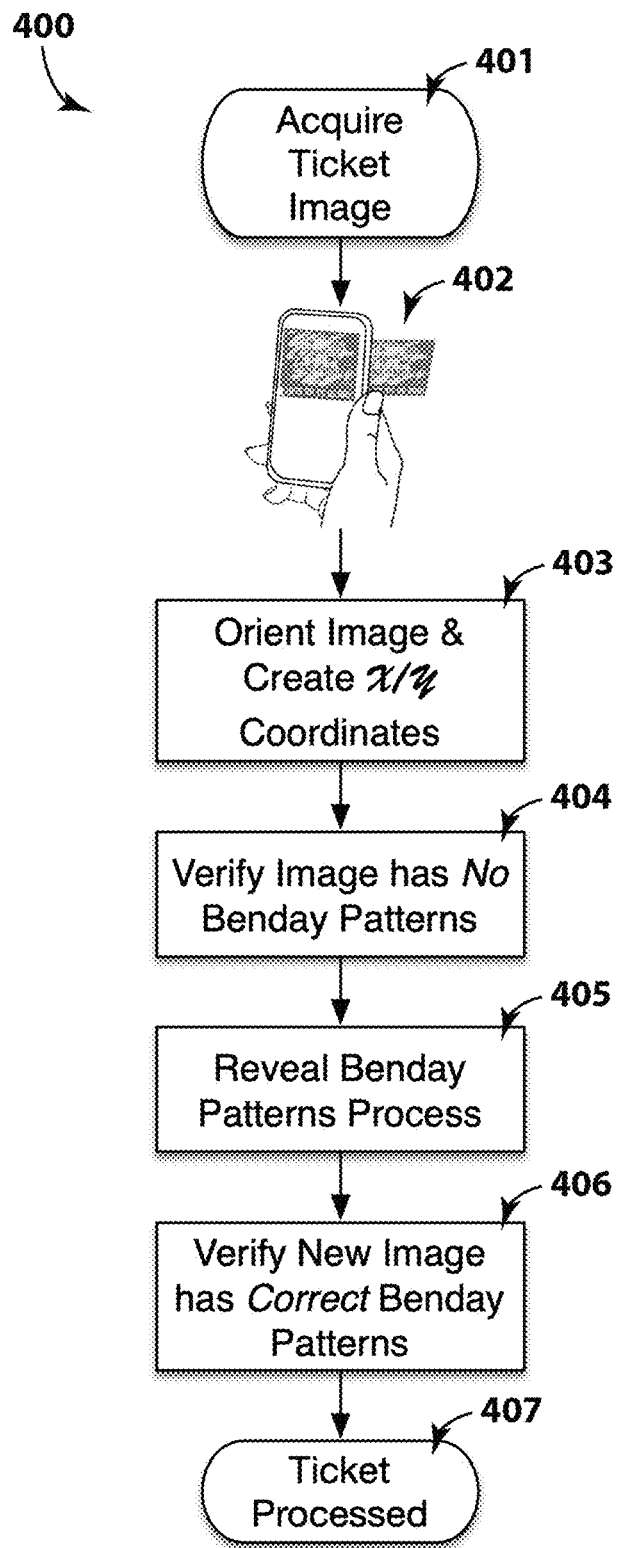
FIG. 4A is a high-level flow diagram of a method for scanning and detecting a steganographic Benday pattern on an instant lottery ticket as a security countermeasure in accordance with various embodiments of the present disclosure.
Figure 4B:
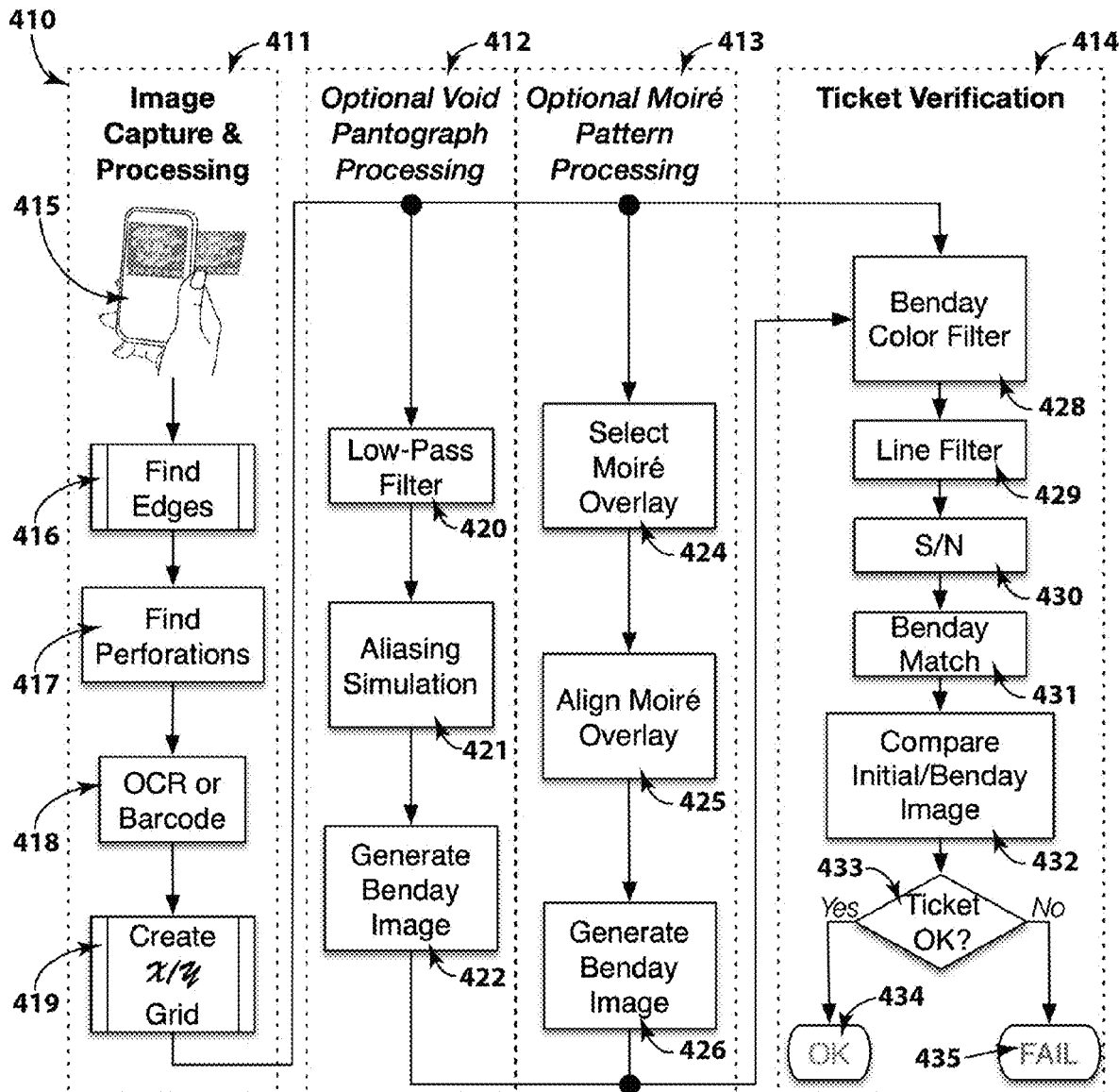
FIG. 4B is a detailed flow diagram of a method for scanning and detecting a steganographic Benday pattern on an instant lottery ticket as a security countermeasure in accordance with various embodiments of the present disclosure.
Figure 4C:
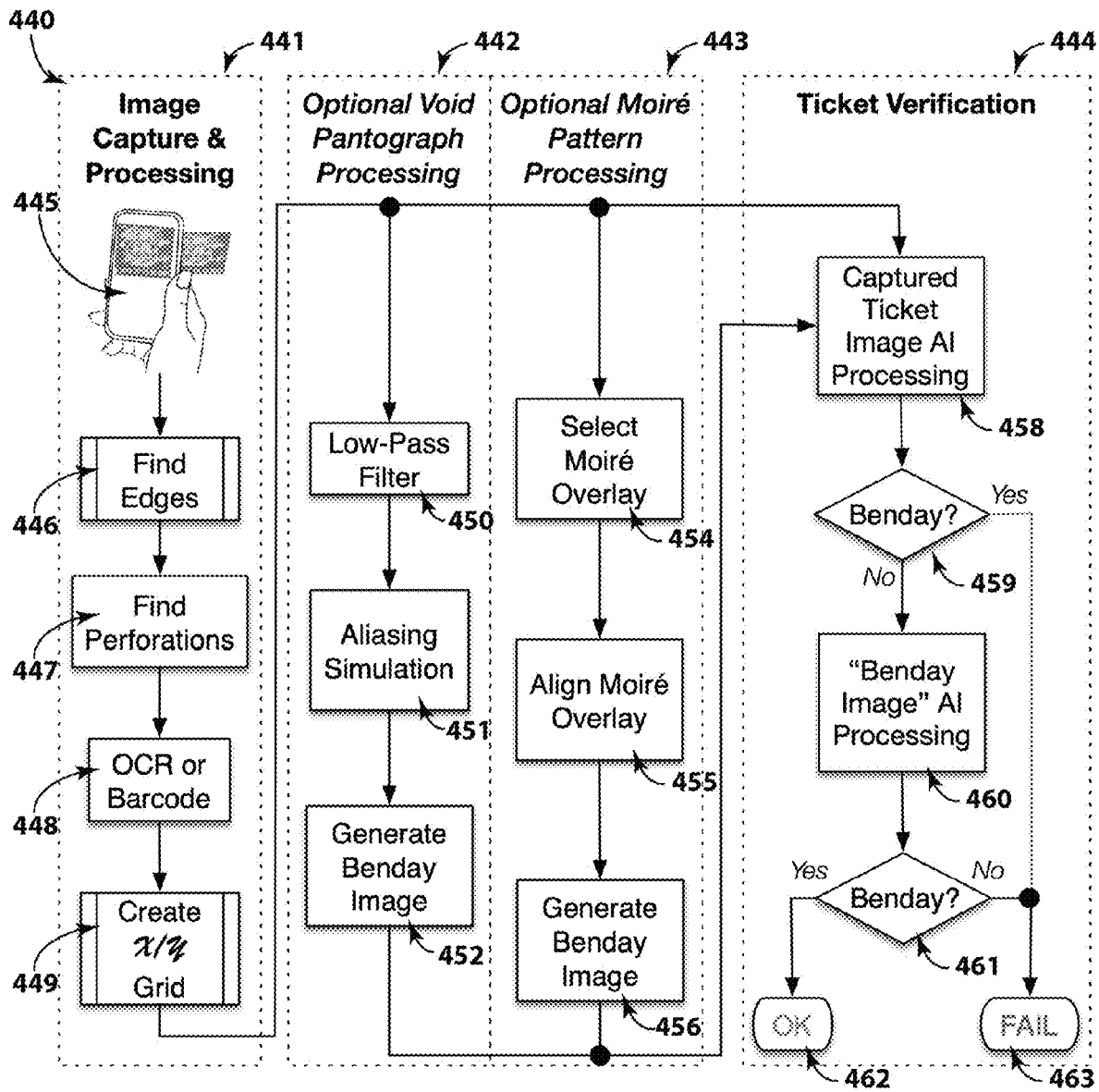
FIG. 4C is a detailed flow diagram of a method for scanning and detecting a steganographic Benday pattern on an instant lottery ticket as a security countermeasure utilizing an Artificial Intelligence (AI) neural network in accordance with various embodiments of the present disclosure.
Figure 4D:
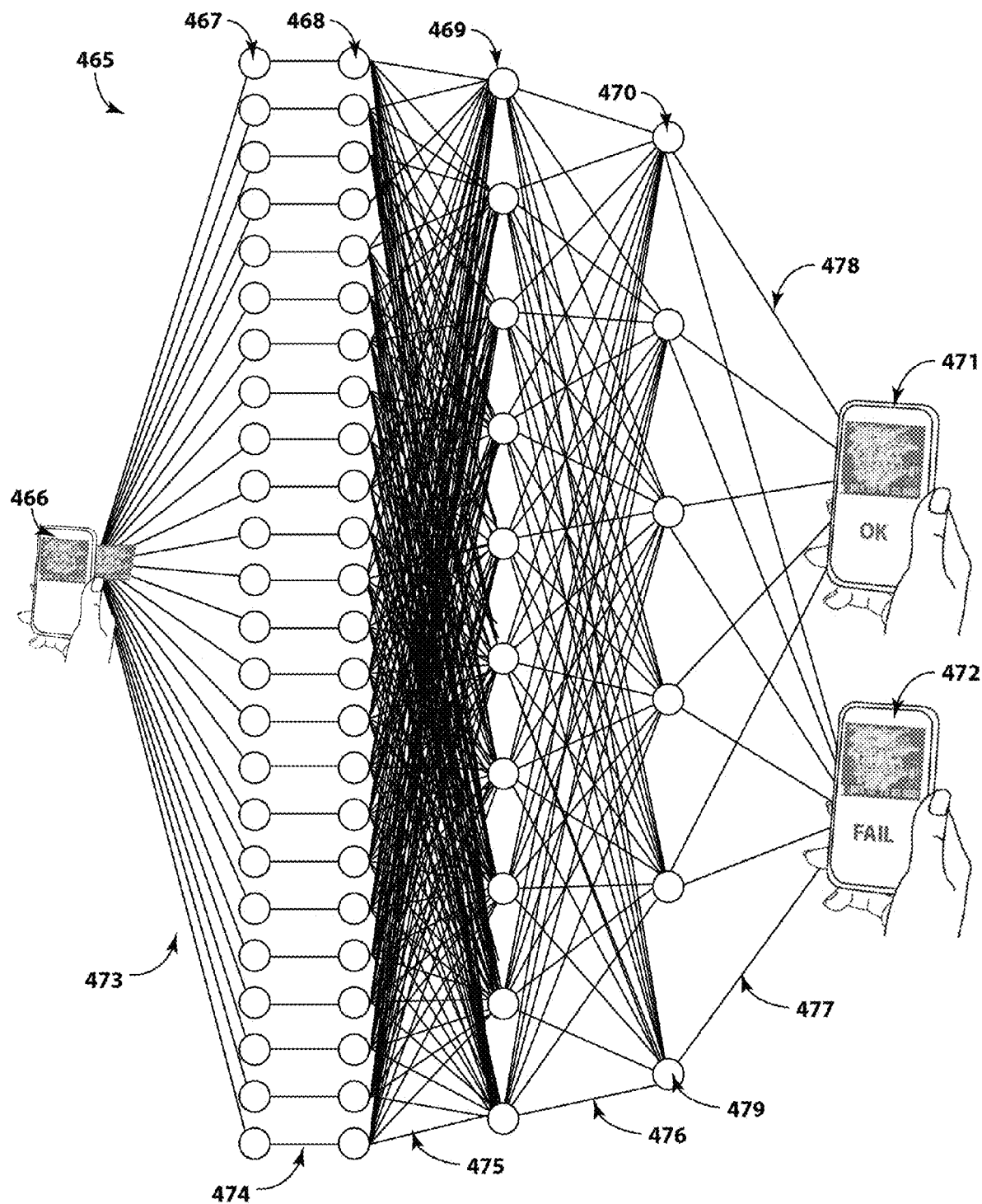
FIG. 4D is a diagram showing a neural network of a system and method using the AI portion of FIG. 4C for scanning and detecting a steganographic Benday pattern on an instant lottery ticket as a security countermeasure in accordance with various embodiments of the present disclosure.
Figure 4E:
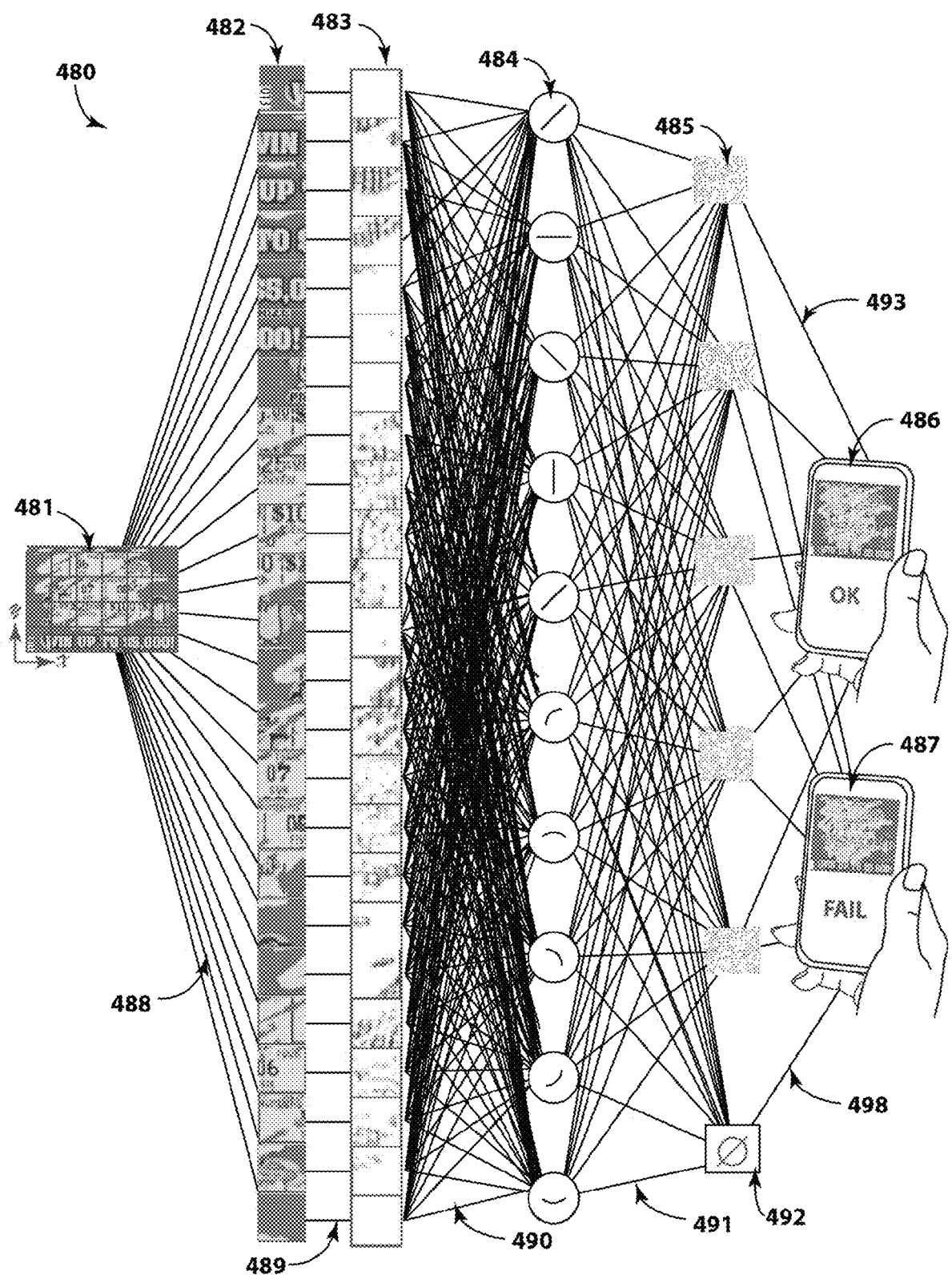
FIG. 4E is a diagram showing the functional nodes of the AI neural network example of FIG. 4D in accordance with various embodiments of the present disclosure.

FIGS. 4A thru 4E provide example embodiments of the systems, methods, and devices for verifying the authenticity and integrity of instant lottery tickets by scanning for previously hidden steganographic Benday patterns in acquired digital ticket images with an EVM. FIG. 4A illustrates an example embodiment for verifying that an instant lottery ticket initially does not display a Benday pattern but does display a Benday pattern after the steganographic reveal process is completed. FIG. 4B illustrates an example embodiment for verifying the authenticity and integrity of instant lottery tickets by scanning for a previously hidden steganographic Benday pattern compatible with FIG. 4A. FIG. 4C illustrates an example embodiment that employs an Artificial Intelligence (AI) neural network for verifying the authenticity and integrity of instant lottery tickets by scanning for a previously hidden steganographic Benday pattern that is also compatible with FIG. 4A. FIG. 4D illustrates an example embodiment that employs a neural network of the AI portion of FIG. 4C. FIG. 4E illustrates an example embodiment of the functional nodes of the AI neural network representative example of FIG. 4D.

The method 400 shown in FIG. 4A begins with the EVM 402 acquiring a digital ticket image of the front of a candidate instant lottery ticket with its digital color camera, as indicated by block 401. The EVM 402 then finds the perforated and smooth edges in the digital ticket image of the instant lottery ticket that can include using OCR and/or barcode data to determine the orientation of the digital ticket image to enable subsequent overlaying of the x/y grid on a modified digital ticket image, as indicated by block 403. The EVM then analyzes the modified digital ticket image to ensure that the modified digital ticket image does not initially display any Benday patterns in the general area under any removed SOC, as indicated by block 404. The EVM then digitally processes the digital ticket image to reveal any steganographic Benday patterns on the instant lottery ticket, as indicated by block 405. The actual digital processing 405 can vary depending on whether the Benday pattern was embodied in a void pantograph or moiré background pattern, but either process will attempt to reveal a previously hidden Benday pattern. After the reveal processing is completed, the EVM analyzes the post-reveal modified digital ticket image ("Benday Digital Image") to determine if a Benday pattern is now apparent and, optionally, if it is the correct and/or unaltered Benday pattern appropriate the candidate instant lottery ticket, as indicated by block 406. Assuming the digital ticket image does not display a Benday pattern, and the "Benday Digital Image" displays a Benday pattern, the EVM can conclude that the instant lottery ticket is authentic and/or intact during this ticket validation process, as indicated by block 407. Conversely, if the EVM determines that either the modified digital ticket image displays a Benday pattern or the "Benday Digital Image" did not display a Benday pattern, the EVM will conclude that the instant lottery ticket is not authentic and/or intact during this ticket validation process, as indicated by block 407. Optionally, the EVM can also verify the integrity of any detected Benday pattern (e.g., the Benday lines are continuous and do not end in the image), thereby providing an additional countermeasure to cut-and-paste attacks.

The example process 410 of FIG. 4B can be conceptually divided into four different processing steps including Image Capture & Processing 411, Optional Void Pantograph Processing 412, Optional Moiré Pattern Processing 413, and Ticket Verification 414 as indicated by the four separate columns. In this example embodiment, if a particular process appears completely within a column, its functionality is limited to the category of that associated column. For example, the Find Edges 416 process is exclusively part of the Image Capture & Processing 411 column. However, it should be appreciated that the present disclosure contemplates that certain of the sub-processes can be combined or performed in different orders.

In various embodiments, all of the processing steps are performed by the EVM. In other embodiments, one or more of these processing steps are performed by a system that communicates with the EVM but is separate from the EVM. For brevity, all of the processing steps are described as being performed by the EVM herein.

The method 410 shown in FIG. 4B begins with the EVM acquiring a digital ticket image of a candidate instant lottery ticket with a digital color camera, as indicated by callout 415. The EVM processes the digital ticket image using an algorithm that analyzes the digital ticket image, isolating the digital ticket image from the image background, and finding the edges of the ticket within the digital ticket image, as indicated by block 416. After the edges are found, the EVM analyzes the found edges to determine which pair of edges are the perforated edges, as indicated by block 417. After the perforated edges are found, the EVM then aligns the digital ticket image (e.g., with the correct skew and rotation) such that it is parallel to the axes of an x/y grid, as indicated by block 419. This alignment process places the perforated edges of the digital ticket image parallel to the x-axis with the smooth edges of the digital ticket image parallel to the y-axis, then saving the modified digital image with the generated x/y grid overlay.

Since there are at least two perforated and smooth edges of the digital ticket image, there are two possible orientations of the modified digital ticket image. With one orientation, the modified digital ticket image is oriented right side up, and with the other orientation, the modified digital ticket image is oriented upside down (such as shown in FIG. 3C). While it is theoretically possible to simply process both possible orientations of the modified digital ticket image separately, it can be more efficient to determine the correct orientation by scanning the modified digital ticket image using an Optical Character Recognition ("OCR") process, as indicated by block 418 (FIG. 4B) to detect human-readable text and then utilizes the detected text to properly orient the modified digital ticket image. Alternatively, if the modified digital ticket image includes a barcode, the barcode can be detected and utilized to properly orient the digital ticket image, as also indicated by block 418. The OCR and/or barcode detection and decoding alternative embodiments have the advantage of readily identifying the modified digital ticket image to the EVM. Thus, with OCR and/or barcode detection, it can be possible for the EVM to reference a database identifying the specific structure and color of the Benday pattern for a more detailed analysis. Ideally, this type of modified digital ticket image database information can be downloaded to each EVM, such as via an encrypted signature map.

Returning to the validation process 410, after the modified digital ticket image is aligned and properly oriented, the EVM can place an x/y grid as a separate layer on top of the modified digital ticket image to assist with subsequent processing, as indicated by block 419. Once the x/y grid is overlayed, the Image Capture & Processing 411 portion of the validation process is complete with the modified digital ticket image and associated overlayed x/y grid forwarded to either Void Pantograph Processing 412 or Moiré Pattern Processing 413, depending on how the candidate instant lottery ticket was printed. This determination of which process (412 or 413) can be institutional-wide (e.g., for all instant lottery tickets within a given institution printed as void pantographs) or derived from specific instant lottery ticket information (such as a signature map) that was determined by decoding the barcode or human readable characters (OCR) of the modified digital ticket image, as indicated by block 418.

The Optional Void Pantograph Processing 412 begins with the EVM applying a Low-Pass Filter to the modified digital ticket image, as indicated by block 420. The exact structure of the Low-Pass Filter will vary depending on how the void pantograph was printed on the original instant lottery ticket. Generally, the Low-Pass Filter 420 can simulate a generic photocopy machine by slightly blurring edges and altering the resolution of the digital ticket image. Additionally, since human vision is sensitive to luminance contrast ratios, a grid of very small dark dots and/or lines will appear to human vision as a general grey region. The Low-Pass Filter 420 can be configured to detect and amplify these printed differences in the general gray region. For example, with the magnified general gray region illustrated in FIG. 2B, the differences between the dot fields 212 and line fields 211 can be exploited by digitally simulating a line scanner passing over the general gray region with the simulated line scanner detecting the dots as more-or-less isolated dot fields 212 and the line fields 211 as a larger homogeneous whole.

In addition, or instead of the Low-Pass Filter step indicated by block 420, the EVM can employ an optional Aliasing simulation that slightly skews the digital ticket image relative to the digital line scanner, as indicated by block 421. With some printed embodiments (e.g., the combination dot 212 and line 211 fields of FIG. 2B), this optional Aliasing process can significantly amplify the effects of the Low-Pass Filter step 420 by rotating the modified digital ticket image to an angle relative to the digital line scanner thereby maximizing the distortion or artifact of the embedded steganographic Benday pattern in the modified digital image.

The Optional Void Pantograph Processing 412 further includes generating a separate "Benday Digital Image" that is a copy of the captured digital ticket image after the Low-Pass Filter and Aliasing post-image processes have been completed, as indicated by block 422. At this stage of the processing, the generated "Benday Digital Image" may or may not readily display a Benday pattern since it is simply a copy of the modified digital ticket image after the above post-image processing has been completed.

The Optional Moiré Pattern Processing 413 begins with the EVM first selecting an appropriate Moiré Pattern Overlay to be digitally placed over the modified digital ticket image as a separate layer, as indicated by block 424. The Moiré Pattern Overlay includes a partially opaque ruled pattern with transparent gaps that are digitally overlaid over the digital ticket image. For the desired moiré interference Benday pattern to appear, the Moiré Pattern Overlay must not be completely identical to the printed ticket pattern but rather displaced, rotated, or otherwise configured with a slightly different pitch. As before, the selection of the correct Moiré Pattern Overlay can be institutional-wide or derived from specific instant lottery ticket information that was determined by decoding the captured ticket image's barcode or human readable characters (OCR) in step 418.

After the Moiré Pattern Overlay has been selected, the EVM aligns the separate Moiré Pattern Overlay layer on top of the modified digital ticket image in an orientation that will theoretically maximize and amplify the moiré interference Benday pattern, as indicated by block 425. The modified digital ticket image overlayed x/y grid is utilized as a reference to correctly Align the Moiré Overlay.

The Optional Moiré Pattern Processing 413 then includes the EVM generating a separate "Benday Digital Image" that is a copy of the modified digital ticket image after the Moiré Pattern Overlay and Align the Moiré Overlay post-image processes have been completed, as indicated by block 426. Both the digital ticket image and the "Benday Digital Image" with associated overlayed x/y grids are provided for use in the Ticket Verification process 414.

Regardless of whether the Optional Void Pantograph Processing 412 or the Optional Moiré Pattern Processing 413 generated the "Benday Digital Image" as indicated by blocks 422 and 426, the EVM first subjects the resultant "Benday Digital Image" to a Benday Color Filter that effectively deletes all other colors in the "Benday Digital Image" except for the theoretical printed Benday color thereby greatly reducing noise from the "Benday Digital Image" background, as indicated by block 428. As indicated above, the selection of the correct Benday Color Filter can be institutional-wide or derived from specific instant lottery ticket information that is determined by decoding the barcode or human readable characters (OCR) of the digital ticket image as indicated by block 418.

The Ticket Verification process 414 further includes the EVM filtering the "Benday Digital Image" by applying a Line Filter to the color filtered "Benday Digital Image" that deletes any remaining object artifacts in the image that are not the theoretical line width of the printed Benday pattern on the "Benday Digital Image", as indicated by block 429. The selection of the correct Line Filter can be institutional-wide or derived from specific instant lottery ticket information determined by decoding the barcode or human readable characters (OCR) of the digital ticket image as indicated by block 418.

The Ticket Verification process 414 further includes the EVM applying a separate Signal-to-Noise (S/N) process to further delete any remaining object artifacts in the digital ticket image that do not exhibit a sufficient contrast ratio relative to the deleted background, as indicated by block 430. After this S/N process is completed, the EVM compares the resultant candidate Benday pattern derived from the modified "Benday Digital Image" to the appropriate theoretical Benday pattern for the modified "Benday Digital Image" to determine if any detected Benday pattern is a close enough match to the ticket's theoretical Benday pattern, as indicated by block 431. In various embodiments, this close enough match to the ticket's theoretical Benday pattern can also be used to detect ticket tampering by identifying breaks in the Benday lines. The selection of the correct theoretical Benday pattern can be institutional-wide or derived from specific instant lottery ticket information that was determined by decoding the barcode or human readable characters of the digital ticket image as indicated by block 418 or be compatible with an algorithmic definition of the correct theoretical Benday pattern. In various embodiments, the last digit of the instant lottery ticket number can be used to identify the correct theoretical Benday pattern.

The EVM then analyzes the modified digital ticket image to verify that it does not readily display a Benday pattern, and the EVM analyzes the modified "Benday Digital Image" to verify that it does readily display a Benday pattern, as indicated by block 432. If the modified digital ticket image does not readily display a Benday pattern and the modified "Benday Digital Image" does readily display a suitable Benday pattern, as indicated by the decisions from diamond 433, the EVM validates the instant lottery ticket and displays or otherwise provides an indication of the validation of the instant lottery ticket (as being authentic and intact), as indicated by block 434. Conversely, the EVM can conclude that the instant lottery ticket is fraudulent and will not validate the ticket displaying or otherwise providing a rejection of the instant lottery ticket (as not being authentic and/or intact), as indicated by block 435.

Similarly, the example process 440 of FIG. 4C can be conceptually divided into four different processing steps including the Image Capture & Processing 441, the Optional Void Pantograph Processing 442, the Optional Moiré Pattern Processing 443, and the Ticket Verification 444) as indicated by the four separate columns. In this example embodiment, if a particular process appears completely within a column, its functionality is limited to that category of the associated column. For example, the Find Edges 446 is exclusively part of the Image Capture & Processing 441 column. However, it should be appreciated that the present disclosure contemplates that certain of the sub-processes can be combined or performed in different orders.

In various embodiments, all of the processing steps are performed by the EVM. In other embodiments, one or more of these processing steps are performed by a system that communicates with the EVM but is separate from the EVM. For brevity, all of the processing steps are described as performed by the EVM herein.

The process 440 of FIG. 4C begins with the EVM acquiring a digital ticket image of the candidate instant lottery ticket, as indicated by callout 445. The EVM processes the digital ticket image using an algorithm that analyzes the digital ticket image, isolates the digital ticket image from the image background, and finds the edges of the ticket within the digital ticket image, as indicated by block 446. The EVM then analyzes the found edges to determine which pair of edges are perforated, as indicated by block 447. The EVM then positions the digital ticket image such that it can be aligned parallel to the axes of an x/y grid, as indicated by block 447. This alignment process places the perforated edges of the digital ticket image parallel to the x-axis with the smooth edges of the ticket parallel to the y-axis, then saving the modified digital image with the generated x/y grid overlay.

Since there are at least two perforated and smooth edges in the modified digital ticket image, there are two possible orientations of the modified digital ticket image including one with the modified digital ticket image oriented right-side-up and the other with the modified digital ticket image oriented upside-down (such as in FIG. 3C). While it is theoretically possible to process both possible orientations of the modified digital ticket image separately, it can be more efficient to determine the correct orientation by scanning the modified digital ticket image with an OCR process, as indicated by block 448, to detect human-readable text and then utilize the detected text to orient the modified digital ticket image properly. Alternatively, if the modified digital ticket image includes a barcode, the barcode can be detected and utilized to properly orient the modified digital ticket image, as indicated by block 448. The OCR and barcode detection and decoding alternative embodiments have the advantage of possibly identifying the modified digital ticket image to the EVM. Thus, with OCR and barcode detection, it can be possible for the EVM to reference a database identifying the specific structure and color of the Benday pattern printed for that candidate instant lottery ticket for a more detailed analysis. In various embodiments, this type of modified digital ticket image database information can be downloaded to each EVM, such as via an encrypted signature map.

Returning to the validation process, after the modified digital ticket image is aligned and properly oriented, the EVM can overlay an x/y grid 449 as a separate layer to assist with subsequent processing. Once the x/y grid 449 is overlayed, the Image Capture & Processing 441 portion of the validation process is complete with the modified digital ticket image and associated overlayed x/y grid forwarded to either Void Pantograph Processing 442 or Moiré Pattern Processing 443, depending on how the candidate instant lottery ticket was printed. This determination process can be institutional-wide or derived from specific instant lottery ticket information that was determined by decoding the modified digital ticket image's barcode or human readable characters (OCR) 448.

The Optional Void Pantograph Processing 442 begins with the EVM applying a Low-Pass Filter 450 to the modified digital ticket image, as indicated by block 450. The exact structure of the Low-Pass Filter 450 can vary depending on how the void pantograph was printed on the original instant lottery ticket. Generally, the Low-Pass Filter can simulate a generic photocopy machine by slightly blurring edges and altering the resolution of the captured ticket image. Additionally, since human vision is sensitive to luminance contrast ratios, a grid of very small dark dots and/or lines will appear to human vision as a general grey region. The Low-Pass Filter of the EVM can be configured to detect and amplify these printed differences within the general grey region. For example, with the magnified general gray region such as illustrated in FIG. 2B, the differences between the periodic dot fields 212 and line fields 211 can be exploited by digitally simulating a line scanner passing over the general gray region with the simulated line scanner detecting the dots as more-or-less isolated dot fields 212 and the line fields 211 as a larger homogeneous whole.

In addition to or instead of the Low-Pass Filter, the EVM can digitally simulate optional Aliasing simulation by slightly skewing the modified digital ticket image relative to the digital line scanner, as indicated by block 451. With certain printed embodiments (e.g., the combination dot 212 and line 211 fields of FIG. 2B), this optional Aliasing simulation can significantly amplify the effects of the Low-Pass Filter, by rotating the modified digital ticket image to an angle relative to the digital line scanner thereby maximizing the distortion or artifact of the embedded steganographic Benday pattern in the modified digital image.

The Optional Void Pantograph Processing 442 further includes the EVM generating a separate "Benday Digital Image" that is a copy of the modified digital ticket image after the Low-Pass Filter and Aliasing simulation post-image processes have been completed, as indicated by block 452.

The Optional Moiré Pattern Processing 443 begins with the EVM first selecting an appropriate Moiré Pattern Overlay to be digitally placed over the modified digital ticket image as a separate layer, as indicated by block 454. The Moiré Pattern Overlay includes a partially opaque ruled pattern with transparent gaps that are digitally overlaid over the modified digital ticket image. For the desired moiré interference Benday pattern to appear, the Moiré Pattern Overlay 454 must not be completely identical to the printed ticket pattern but rather displaced, rotated, or otherwise configured with a slightly different pitch. As indicated above, the selection of the correct Moiré Pattern Overlay 454 can be institutional-wide or derived from specific instant lottery ticket information determined by decoding the barcode of the modified digital ticket image or human readable characters (OCR).

After the Moiré Pattern Overlay has been selected, the EVM aligns the separate Moiré Pattern Overlay 454 layer on top of the modified digital ticket image in an orientation that will theoretically maximize and amplify the moiré interference Benday pattern, as indicated by block 455. The EVM utilizes the modified digital ticket image overlayed x/y grid as a reference to correctly Align the Moiré Overlay.

The Optional Moiré Pattern Processing 443 includes the EVM generating a separate "Benday Digital Image" that is a copy of the modified digital ticket image after the Moiré Pattern Overlay and Align the Moiré Overlay post-image processes have been completed. Both the captured ticket and "Benday Digital Image" with associated overlayed x/y grids are then provided for the Ticket Verification process 444.

Regardless of whether the Optional Void Pantograph Processing or the Optional Moiré Pattern Processing is utilized, the EVM submits the modified digital ticket image to an Artificial Intelligence (AI) neural network 458 (shown in more detail as 465 and 480 of FIGS. 4D and 4E, respectively) in this embodiment to assess whether a Benday pattern is readily apparent in the modified digital ticket image or not, as indicated by diamond 459. If a Benday pattern is readily apparent in the modified digital ticket image, then the candidate instant lottery ticket is deemed fraudulent and rejected by EVM, as indicated by block 463. Alternatively, if no Benday pattern is readily apparent in the modified digital ticket image, then the EVM proceeds to analyze the post-processed "Benday Digital Image."

The EVM submits the post-processed "Benday Digital Image" to the same AI neural network to assess whether the correct Benday pattern is readily apparent in the "Benday Digital Image," as indicated by block 460. If the correct Benday pattern is not readily apparent in the "Benday Digital Image," then the instant lottery ticket is deemed fraudulent as indicated by diamond 461 and rejected by the EVM as indicated by block 463. Alternatively, if the correct Benday pattern is determined as indicated by diamond 461 to be readily apparent in the "Benday Digital Image," then the candidate instant lottery ticket is validated by the EVM, as indicated by block 462.

FIGS. 4D and 4E, taken together, provide an example embodiment of an Artificial Intelligence (AI) neural network (465 and 480, respectively) utilized for detecting steganographic Benday patterns in instant lottery tickets. FIG. 4D illustrates the overall high-level neural network and FIG. 4E provides explanatory graphical details of the neural network of FIG. 4D.

FIGS. 4D and 4E show that the EVM 466 can create a digital ticket image 481 of an instant lottery ticket with the modified digital ticket image aligned and a second "Benday Digital Image" generated from post-processing (such as via steps 441 thru 443 of FIG. 4C). In this example, both the modified digital ticket image and the generated "Benday Digital Image" are then divided as indicated by lines 473 and 488 into twenty-four different nodes 467 and 482 corresponding to the exemplary twenty-four different grid cells created by the x/y grid overlay 481. As illustrated in FIG. 4E, each of the twenty-four different grid cells embodies a discrete portion of the modified digital ticket image 482 arranged in an orderly fashion. These twenty-four different grid cells are then processed as indicated by lines 474 and 489 by either the Void Pantograph or Moiré Pattern processes (such as via steps 442 and 443, respectively of FIG. 4C) to create twenty-four exemplary grid cells 468 and 483, respectively that may or may not embody isolated portions of a detected steganographic Benday pattern.

All of the generated twenty-four different grid cells 468 and 483 are then submitted as indicated by lines 475 and 490 to ten different processing nodes 469 and 484 that each attempt to algorithmically detect different generic portions of Benday lines. The detected outputs from each of the exemplary ten different processing nodes 469 and 484 are then submitted as indicated by lines 476 and 491 to an array of nodes 470 and 485 that either attempt to identify a specific Benday pattern (such as five shown in the example of FIGS. 4D and 4E) or conclude that no Benday pattern was present as indicated by nodes 479 and 492. Any correct correlation with any one of the five exemplary Benday patterns is routed as indicated by lines 478 and 493 to the EVM with a positive outcome. The EVM then displays that a conclusion has been reached in which the instant lottery ticket is validated, as indicated by messages 471 and 486. Alternatively, if a Benday pattern is detected in the modified digital ticket image, or if no Benday pattern is detected in the "Benday Digital Image," or if an incorrect and/or damaged Benday pattern is detected, the failure conclusion is routed as indicated by lines 477 and 498 to the EVM that then displays a suitable Failed message such as example messages 472 and 487.

In various embodiments, the exemplary disclosed AI neural network of FIGS. 4D and 4E must first be "trained." With this exemplary embodiment, the training process is accomplished by submitting a large quantity of sample digital ticket images along with the correct conclusion (e.g., valid ticket with Benday pattern "x," invalid ticket) embedded as metadata. This plurality of sample digital ticket images enables the AI neural network to train or self-tune its assessment methodology by establishing a feedback loop after processing each sample digital ticket image. Since each sample digital ticket image includes metadata informing the AI neural network what the correct result was, the AI process can self-assess its own conclusions and automatically adjust or tune each nodal connection or line (such as 474 and 489, 475 and 490, or 476 and 491) by adding weighing and bias coefficients to data passed through these connections in an attempt to achieve the correct result. In the context of this disclosure, a weighing coefficient is a number that is multiplied by the data passed through each nodal connection or line, and a bias coefficient is a number that is added to the data passed through each nodal connection or line. In the exemplary AI neural network of FIGS. 4D and 4E, there are 324 different nodal connections or lines illustrated with 648 different weighing and bias coefficients possible. Depending on the range of weighing and bias coefficients employed, in excess of trillions of possible combinations can be readily expected. Thus, the complexity of the exemplary AI neural network of FIGS. 4D and 4E will far exceed any human's ability to comprehend why any particular nodal connection or line was assigned a particular weight and bias coefficient, therefore the AI tuning or machine learning will, in theory, outperform a human in determining instant lottery ticket authenticity and integrity.

Figure 5A:
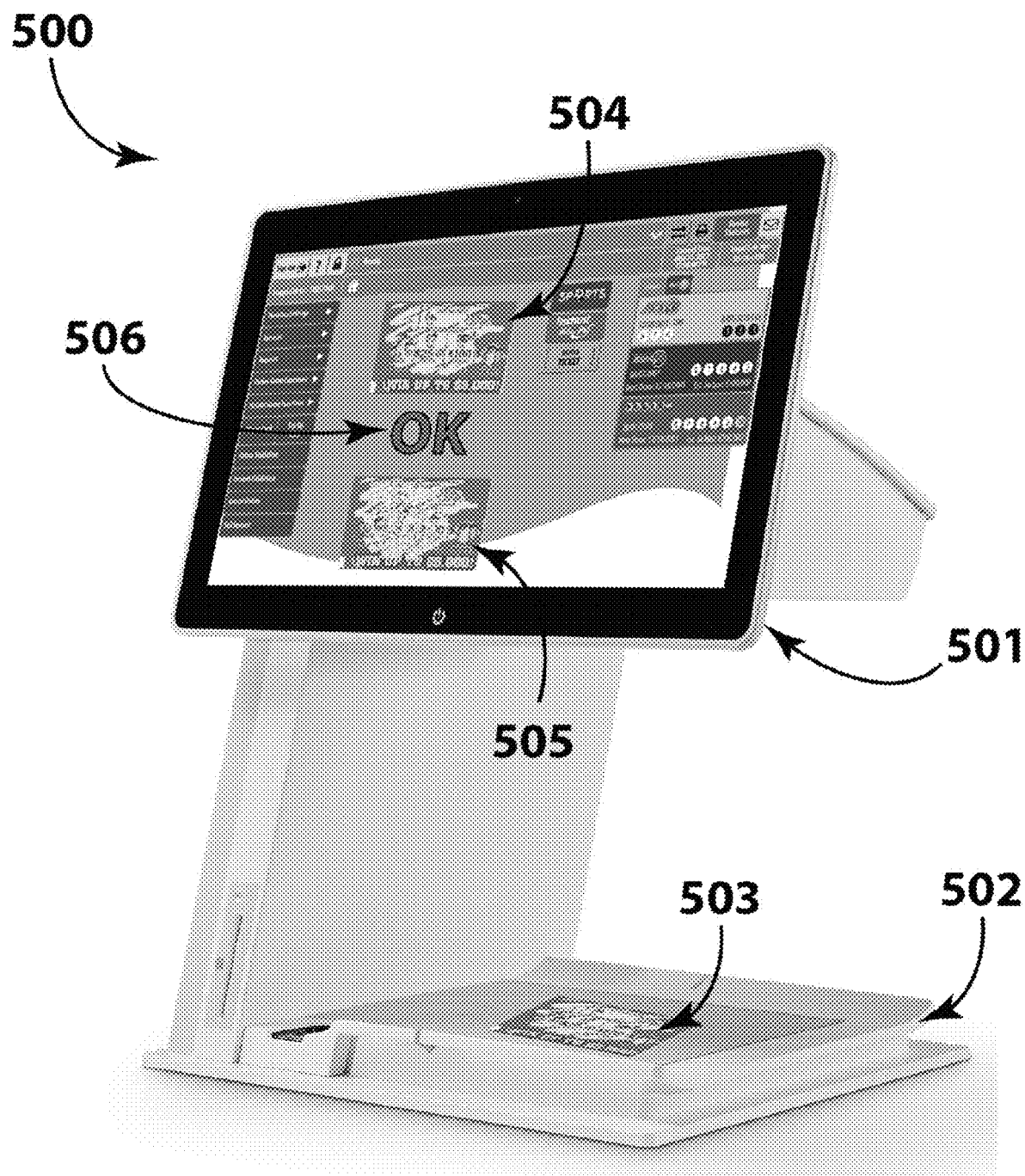
FIG. 5A is a perspective view of a camera-enabled lottery terminal for detecting a steganographic Benday pattern on an instant lottery ticket as a security countermeasure in accordance with various embodiments of the present disclosure.
Figure 5B:
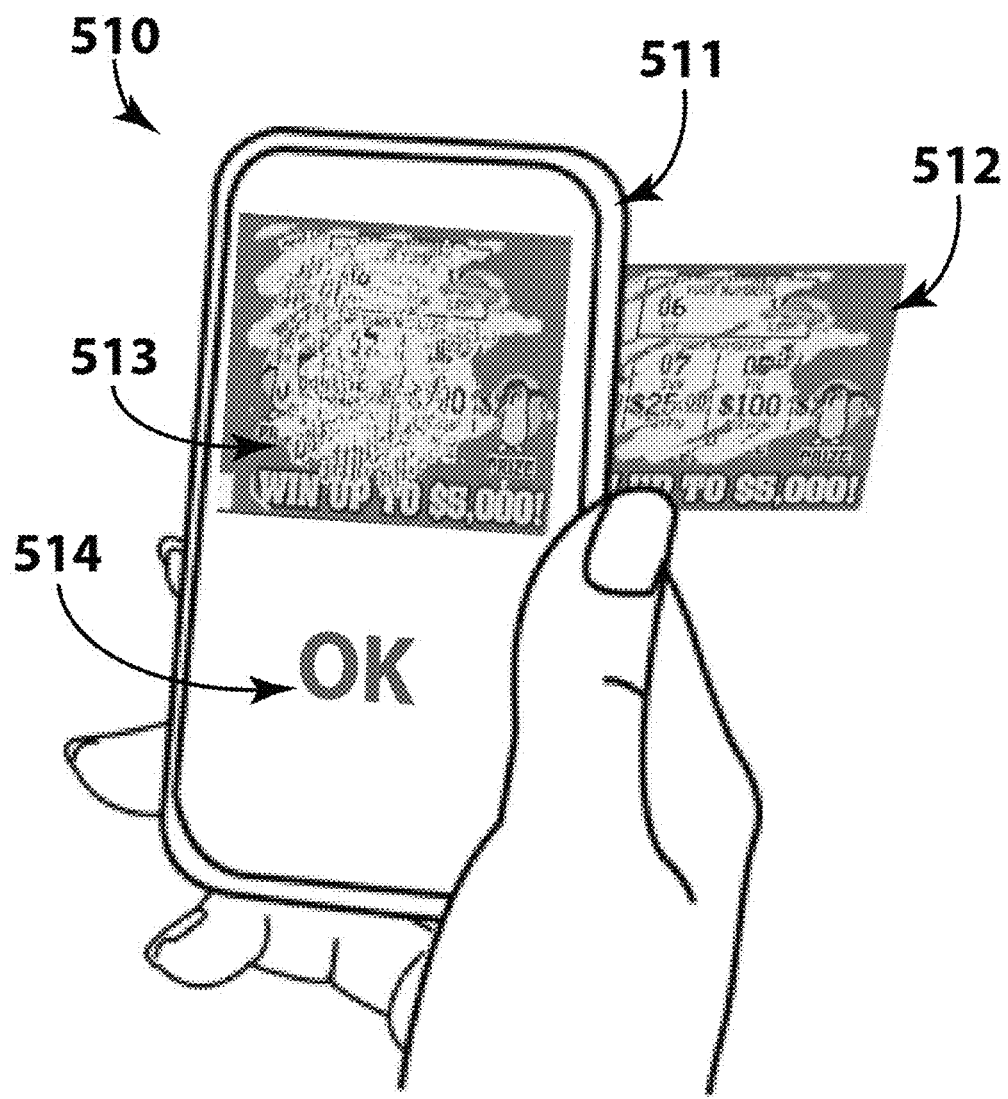
FIG. 5B is a perspective view of a smartphone equipped with an application for detecting a steganographic Benday pattern on an instant lottery ticket as a security countermeasure in accordance with various embodiments of the present disclosure.

FIGS. 5A and 5B illustrate two alternative example embodiments of EVMs capable of ensuring the authenticity and integrity of instant lottery tickets by detecting steganographic Benday patterns. FIG. 5A illustrates a camera-enabled lottery terminal 500 with a steganographic Benday pattern detection application in accordance with a first example embodiment of the present disclosure and FIG. 5B illustrates a smartphone 510 that is enabled with a steganographic Benday pattern detection application in accordance with a second exemplary embodiment of the present disclosure.

The lottery terminal 500 of FIG. 5A is representative of a terminal that can be placed in a suitable location, such as in a traditional brick-and-mortar convenience store for lottery sales and redemptions. To function as a steganographic Benday pattern EVM, the terminal 500 includes a downward-facing color camera 501 (not shown in FIG. 5A) that is focused on a horizontal platen 502. When a candidate instant lottery ticket 503 is placed on the platen 502, the downward-facing color camera 501 detects the ticket's presence and activates an internal steganographic Benday pattern detection application to verify the authenticity and integrity of the instant lottery ticket 503. As previously disclosed, the steganographic Benday pattern detection algorithm first captures and modifies the digital ticket image 504, as shown on the display screen of terminal 500. The internal steganographic Benday pattern detection application then verifies that a Benday pattern is not readily apparent on the digital ticket image and then proceeds to digitally post-processes the modified digital ticket image 504, producing a "Benday Digital Image" 505 that is then analyzed for the presence of the correct Benday pattern for the instant lottery ticket 503. Assuming the modified digital ticket image 504 did not include an apparent Benday image and the post-processed "Benday Digital Image" did contain an apparent Benday image 505, the EVM 500 will conclude that instant lottery ticket 503 is authentic and intact. The EMV 500 will display an indication 506 of such determination for the instant lottery ticket 503. Conversely, if the EVM 500 determines that either the modified digital ticket image displays a Benday pattern or the "Benday Digital Image" did not display a Benday pattern, the EVM 500 will conclude that the instant lottery ticket is not authentic and/or intact during this ticket validation process and not validate the candidate ticket.

FIG. 5B illustrates an alternative EVM 510 that includes a smartphone equipped with an internal steganographic Benday pattern detection application. This alternative embodiment EVM 510 can be used to verify the authenticity and integrity of instant lottery tickets in locations without lottery terminals (e.g., street vendors, brick-and-mortar retailers with no network connection). With this alternative embodiment, the smartphone's internal camera 511 can be focused on a candidate instant lottery ticket 512 to enable the steganographic Benday pattern detection application to first capture an initial digital ticket image and modify the image for analysis. The steganographic Benday pattern detection application can then verify that no Benday pattern is readily apparent on the modified digital ticket image, and then digitally post-process the modified digital ticket image to produce a "Benday Digital Image" 513 that is then analyzed for the presence of the correct Benday pattern for the instant lottery ticket 512. Assuming the modified digital ticket image did not include an apparent Benday image, and the post-processed "Benday Digital Image" did contain an apparent Benday image 513, the alternative embodiment EVM will conclude that candidate ticket 512 is authentic and intact 514. The EMV 510 will display an indication 514 of such determination for the instant lottery ticket 512. Conversely, if the EVM 510 determines that either the modified digital ticket image displays a Benday pattern or the "Benday Digital Image" did not display a Benday pattern, the EVM 510 will conclude that the instant lottery ticket is not authentic and/or intact during this ticket validation process and not validate the candidate ticket.

Figure 6:
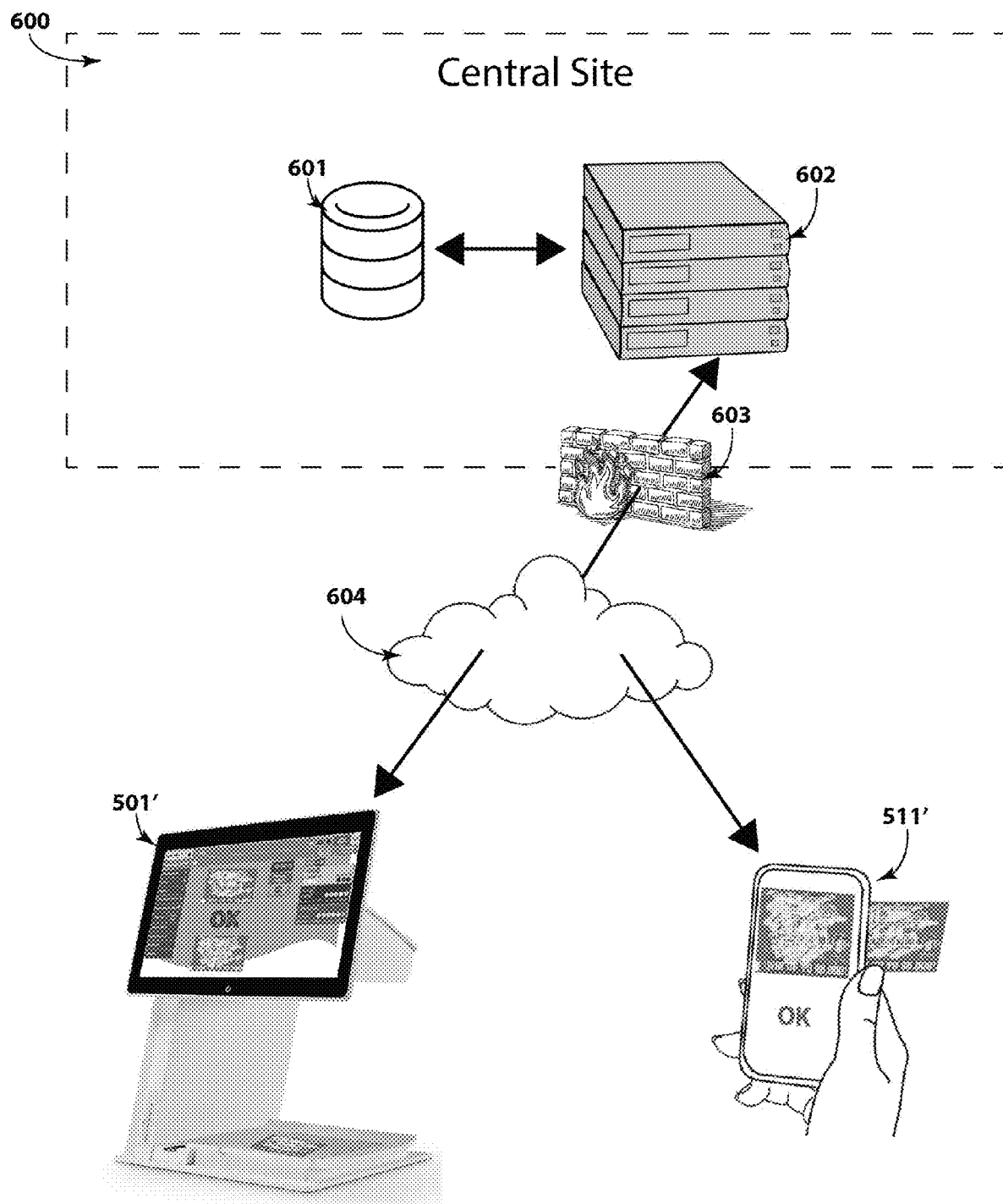
FIG. 6 is a perspective view of a network that supports scanning and detecting steganographic Benday patterns on instant lottery tickets as a security countermeasure in accordance with various embodiments of the present disclosure.

FIG. 6 illustrates exemplary hardware for certain components associated with providing network support 604 for the example EVMs 501' and 511'. This hardware includes a central site 600 that houses a server 602 and a steganographic Benday pattern detection database 601 protected by a firewall 603. The steganographic Benday pattern detection database 601 contains a series of "signature maps" with one signature map associated with each different type of instant lottery ticket game on sale at the current time. Each signature map contains pertinent information about each different type of instant lottery ticket on sale (such as but not limited to the location of the Benday pattern, the type and/or configuration of the Benday pattern, the color of the Benday pattern, etc.). The signature maps can be embodied as self-contained data applets and can be downloaded to the EVMs 501' and 502' via network 604 whenever the EVMs are online. In some embodiments, security can be enhanced by encrypting each signature map with the recipient EVM's public key by server 602 prior to transmitting through the network 604. With this embodiment, the EVMs 501' and 502' can store the signature maps in their local non-volatile memory as ciphertext, only decrypting the signature map with their internal private key when the signature map is needed for validation by each of the EVMs.

It should be appreciated from the above that various embodiments of the present disclosure relate to systems and methods for verifying authenticity of instant lottery tickets having a steganographic Benday pattern printed in a background area adjacent to variable indicia of the instant lottery ticket. The systems and methods are configured to and include: (1) using a digital camera to acquire a digital ticket image of the instant lottery ticket; (2) generating a modified digital ticket image comprising an x/y grid; (3) using the modified digital ticket image to verify that the Benday pattern is not readily apparent; (4) digitally creating a digital photocopy of the digital ticket image and saving a resultant Benday Digital Image; and (5) determining an appearance of a Benday pattern in the Benday Digital Image to verify the authenticity of the instant lottery ticket. These systems methods can be employed for SOC protected documents besides instant lottery tickets. These systems methods can be employed with any of the additional features explained above.

It should be appreciated from the above that various embodiments of the present disclosure relate to systems and methods for verifying authenticity of an instant lottery ticket having a steganographic Benday pattern printed in a background area adjacent to variable indicia of the instant lottery ticket. The systems and methods are configured to and include: (1) using a digital camera to acquire a digital ticket image of the instant lottery ticket; (2) using the digital ticket image to verify that the Benday pattern is not readily apparent; (3) digitally creating a digital photocopy of the digital ticket image; and (4) detecting if a Benday pattern is present in the digital photocopy using an Artificial Intelligence (AI) neural network to verify the authenticity of the instant lottery ticket. These systems methods can be employed for SOC protected documents besides instant lottery tickets. These systems methods can be employed with any of the additional features explained above.

It should be appreciated by those skilled in the art in view of this description that various modifications and variations can be made to the present disclosure without departing from the scope and spirit of the present disclosure. It is intended that the present disclosure include such modifications and variations as come within the scope of the appended claims.

The invention claimed is:

1. A method for verifying the authenticity of an instant lottery ticket having a steganographic Benday pattern printed in the background area adjacent to variable indicia of the instant lottery ticket, the method comprising:
    using a digital camera focused on the instant lottery ticket to acquire a digital ticket image of the instant lottery ticket;
    orienting the digital ticket image to an x/y grid, which comprises:
        finding edges of the instant lottery ticket in the digital ticket image,
        determining a pair of edges of the instant lottery ticket in the digital ticket image that are smooth,
        determining a pair of edges of the instant lottery ticket in the digital ticket image that are perforated,
        aligning the pair of perforated edges of the instant lottery ticket in the digital ticket image to an x-axis of the x/y grid, and
        generating a modified digital ticket image;
    analyzing the modified digital ticket image for the absence of an apparent Benday pattern;
    post-processing the modified digital ticket image to produce a Benday Digital Image;
    analyzing the Benday Digital Image for apparent Benday patterns printed in the background area of the instant lottery ticket in at least one or a plurality of different colors; and
    verifying that the modified ticket image did not include an apparent Benday pattern and that the Benday Digital Image did include an apparent Benday pattern to validate the instant lottery ticket.

2. The method of claim 1, wherein the orienting the digital ticket image to the x/y grid comprises:
    Optical Character Recognition (OCR) scanning the modified digital ticket image for the presence of human-readable text, and
    orienting the modified digital ticket image such that the human-readable text is right side up.

3. The method of claim 2, wherein the Optical Character Recognition (OCR) scanning of the modified digital ticket image for the presence of human-readable text identifies a configuration of the steganographic Benday pattern.

4. The method of claim 3, wherein the identified configuration of the steganographic Benday pattern is one of a plurality of different possible steganographic Benday patterns embodied in a signature map.

5. The method of claim 1, wherein orienting the digital ticket image to the x/y grid comprises:
    scanning the modified digital ticket image for the presence of a machine-readable barcode, and
    orienting the modified digital ticket image with respect to the machine-readable barcode such that the modified digital ticket image is right side up.

6. The method of claim 5, which comprises decoding the machine-readable barcode and identifying a configuration of the steganographic Benday pattern.

7. The method of claim 6, wherein the identified configuration of the steganographic Benday pattern is one of a plurality of possible steganographic Benday patterns embodied in a signature map.

8. The method of claim 1, wherein the steganographic Benday pattern of the instant lottery ticket is printed as a void pantograph.

9. The method of claim 8, wherein the post-processing of the modified digital ticket image comprises a skewed digital line scanner process.

10. The method of claim 1, wherein the steganographic Benday pattern is printed as a moiré pattern.

11. The method of claim 10, wherein the post-processing of the modified digital ticket image includes a moiré pattern overlay.

12. The method of claim 1, wherein the digital camera is a color digital camera.

13. The method of claim 12, which comprises detecting the post-processing Benday pattern using a color filter.

14. The method of claim 1, which comprises detecting the post-processing Benday pattern using a line filter.

15. The method of claim 1, which comprises detecting the Benday Digital Image pattern using an Artificial Intelligence (AI) neural network.

16. A method for verifying authenticity of an instant lottery ticket having a steganographic Benday pattern printed in a background area adjacent to variable indicia of the instant lottery ticket, the method comprising:
    using a digital camera to acquire a digital ticket image of the instant lottery ticket;
    generating a modified digital ticket image comprising an x/y grid;
    using the modified digital ticket image to verify that the Benday pattern is not readily apparent;
    digitally creating a digital photocopy of the digital ticket image and saving a resultant Benday Digital Image; and
    determining an appearance of a Benday pattern in the Benday Digital Image to verify the authenticity of the instant lottery ticket.

17. The method of claim 16, wherein the steganographic Benday pattern is one of a plurality of different possible steganographic Benday patterns embodied in a signature map.

18. A method for verifying authenticity of an instant lottery ticket having a steganographic Benday pattern printed in a background area adjacent to variable indicia of the instant lottery ticket, the method comprising:
    using a digital camera to acquire a digital ticket image of the instant lottery ticket;
    using the digital ticket image to verify that the Benday pattern is not readily apparent;
    digitally creating a digital photocopy of the digital ticket image; and
    detecting if a Benday pattern is present in the digital photocopy using an Artificial Intelligence (AI) neural network to verify the authenticity of the instant lottery ticket.

19. The method of claim 18, wherein the steganographic Benday pattern is one of a plurality of different possible steganographic Benday patterns embodied in a signature map.

20. The method of claim 18, wherein the steganographic Benday pattern of the instant lottery ticket is printed as a void pantograph.

* * * * *